United States Patent
Tang et al.

(10) Patent No.: US 11,556,462 B2
(45) Date of Patent: Jan. 17, 2023

(54) WEAR-LEVELING METHOD FOR CROSS-POINT MEMORY FOR MULTIPLE DATA TEMPERATURE ZONES

(71) Applicant: Futurewei Technologies, Inc., Plano, TX (US)

(72) Inventors: Xiangyu Tang, Santa Clara, CA (US); Ken Hu, Santa Clara, CA (US); Xiaobing Lee, Santa Clara, CA (US); Yunxiang Wu, Santa Clara, CA (US)

(73) Assignee: Futurewei Technologies, Inc., Addison, TX (US)

( * ) Notice: Subject to any disclaimer, the term of this patent is extended or adjusted under 35 U.S.C. 154(b) by 277 days.

(21) Appl. No.: 15/420,696

(22) Filed: Jan. 31, 2017

(65) Prior Publication Data

US 2018/0060227 A1 Mar. 1, 2018

Related U.S. Application Data

(60) Provisional application No. 62/382,581, filed on Sep. 1, 2016, provisional application No. 62/379,228, filed on Aug. 24, 2016.

(51) Int. Cl.
*G06F 12/02* (2006.01)
*G06F 12/122* (2016.01)
*G06F 12/12* (2016.01)

(52) U.S. Cl.
CPC .......... *G06F 12/0246* (2013.01); *G06F 12/02* (2013.01); *G06F 12/122* (2013.01);
(Continued)

(58) Field of Classification Search
CPC .... G06F 12/0246; G06F 12/122; G06F 12/02; G06F 12/12; G06F 2212/1036; G06F 2212/7201; G06F 2212/7211
See application file for complete search history.

(56) References Cited

U.S. PATENT DOCUMENTS 8,416,609 B2   4/2013   Meade
9,087,581 B2   7/2015   Azuma et al.
(Continued)

FOREIGN PATENT DOCUMENTS

CN      1637926 A    7/2005
CN    102289412 A   12/2011
(Continued)

OTHER PUBLICATIONS

Flashdba is a screen shot taken by archive.org on Oct. 10, 2014 of the website https://flashdba.com/2014/09/17/understanding-flash-the-flash-translation-layer/ (Year: 2014).*

(Continued)

*Primary Examiner* — William E. Baughman
*Assistant Examiner* — Janice M. Girouard
(74) *Attorney, Agent, or Firm* — Conley Rose, P.C.

(57) ABSTRACT

A method performed by a processor to improve wear-leveling in a cross-point (X3D) memory, comprises detecting, by a processor coupled to the X3D memory, a trigger event, wherein the X3D memory comprises a first section of memory units and a second section of memory units, and in response to detecting the trigger event, relocating, by the processor, data stored in a first memory unit of the first section of memory units to a memory unit adjacent to a last memory unit of the first section of memory units, and relocating, by the processor, data stored in a first memory unit of the second section of memory units to a memory unit adjacent to a last memory unit of the second section of memory units.

20 Claims, 13 Drawing Sheets

(52) U.S. Cl.
CPC ...... *G06F 12/12* (2013.01); *G06F 2212/1036* (2013.01); *G06F 2212/7201* (2013.01); *G06F 2212/7211* (2013.01)

(56) References Cited

U.S. PATENT DOCUMENTS

| | | | |
|---|---|---|---|
| 2004/0083335 A1* | 4/2004 | Gonzalez | G06F 12/0246 711/103 |
| 2005/0135146 A1 | 6/2005 | Taussig et al. | |
| 2015/0067332 A1* | 3/2015 | Hsu | H04L 9/3271 713/168 |
| 2015/0309926 A1 | 10/2015 | Damle et al. | |
| 2016/0162206 A1 | 6/2016 | Bish et al. | |
| 2016/0203085 A1* | 7/2016 | Kranich | G06F 12/0802 713/2 |
| 2016/0217030 A1 | 7/2016 | Shin et al. | |
| 2016/0232103 A1 | 8/2016 | Schmisseur et al. | |

FOREIGN PATENT DOCUMENTS

| | | |
|---|---|---|
| CN | 202472635 U | 10/2012 |
| CN | 104756088 A | 7/2015 |
| CN | 105446894 A | 3/2016 |
| WO | 2015047348 A1 | 4/2015 |

OTHER PUBLICATIONS

Intel News Release dated Oct. 28, 2009 attached to this office action and availble online at https://www.intel.com/pressroom/archive/releases/2009/20091028corp.htm (Year: 2009).*

Foreign Communication From A Counterpart Application, PCT Application No. PCT/CN2017/097127, English Translation of International Search Report dated Nov. 9, 2017, 7 pages.

Foreign Communication From A Counterpart Application, PCT Application No. PCT/CN2017/097127, English Translation of Written Opinion dated Nov. 9, 2017, 4 pages.

Foreign Communication From A Counterpart Application, European Application No. 17842817.3, Extended European Search Report dated Jul. 19, 2019, 9 pages.

* cited by examiner

WEAR-LEVELING METHOD FOR CROSS-POINT MEMORY FOR MULTIPLE DATA TEMPERATURE ZONES

CROSS-REFERENCE TO RELATED APPLICATIONS

The present application claims priority to U.S. Provisional Patent Application 62/379,228, filed Aug. 24, 2016 by Xiangyu Tang, Ken Hu, Xiaobing Lee, and Yunxiang Wu, and entitled "Wear-Leveling Method for Cross-Point Memory for Multiple Data Temperature Zones," and U.S. Provisional Patent Application 62/382,581, filed Sep. 1, 2016 by Xiangyu Tang, Ken Hu, Xiaobing Lee, and Yunxiang Wu, and entitled "Wear-Leveling Method for Cross-Point Memory for Multiple Data Temperature Zones," both of which are incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The wear on memory cells, or physical locations, within a memory system varies depending upon how often each of the cells is programmed. If a cell or, more generally, a memory unit, is programmed once and then effectively never reprogrammed, the wear associated with that cell will generally be relatively low. However, if a cell is repetitively written to and erased, the wear associated with that cell will generally be relatively high. As logical block addresses (LBAs) are used by hosts, the same physical locations or cells within the flash memory system are repeatedly written to and erased if a host repeatedly uses the same LBAs to write and overwrite data.

When some cells are effectively worn out while other cells are relatively unworn, the existence of the worn out cells generally compromises the overall performance of the flash memory system. In addition to degradation of performance associated with worn out cells themselves, the overall performance of the memory system may be adversely affected when an insufficient number of cells which are not worn out are available to store desired data. Often, a memory system may be deemed unusable when a critical number of worn out cells are present in the memory system, even when many other cells in the flash memory system are relatively unworn.

To increase the likelihood that cells within a flash memory system are worn fairly evenly, wear-leveling operations are often performed. Wear-leveling operations are generally arranged to allow the cells which are associated with particular LBAs to be changed such that the same LBAs are not always associated with the same cells. By changing the cell associations of LBAs, it is less likely that a particular cell may wear out well before other cells wear out.

SUMMARY

Cross-point (X3D) memory includes memory units that can be updated without having to read, erase, and program other memory. Therefore, including an X3D memory in a mobile device provides for faster ways to access and update data using the mobile device. However, current X3D technology does not implement wear-leveling mechanism to increase the lifespan of the X3D memory. Embodiments of the present disclosure involve configuring a plurality of first contiguous memory units as small memory units (SMUs) storing hot data and configuring a plurality of second contiguous memory units as large memory units (LMUs) storing warm or cold data. During each iteration of wear-leveling, hot data stored at a first SMU of the SMUs switches locations with warm/cold data stored at a first LMU of the LMUs. Switching the storage locations of hot data with warm/cold data help ensure that the memory cells of those locations wear out at substantially the same rate. In addition, the data structures stored at the SMUs and LMUs will maintain their relative sequential order due to the contiguous nature of the SMUs and LMUs.

In one example embodiment, the disclosure includes a method performed by a processor to improve wear-leveling in an X3D memory, comprising detecting, by a processor coupled to the X3D memory, a trigger event, wherein the X3D memory comprises a first section of memory units and a second section of memory units, the first section of memory units comprises a plurality of contiguous memory units configured to store data of a first type, and the second section of memory units comprises a plurality of memory units configured store data of a second type, and in response to detecting the trigger event, relocating, by the processor, data stored in a first memory unit of the first section of memory units to a memory unit adjacent to a last memory unit of the first section of memory units, and relocating, by the processor, data stored in a first memory unit of the second section of memory units to a memory unit adjacent to a last memory unit of the second section of memory units. In some embodiments, the disclosure also includes wherein the trigger event occurs when at least one of a frequency of accesses to one or more of the plurality of contiguous memory units in the first section of memory units reaches a pre-determined threshold, and/or wherein the trigger event occurs according to a pre-determined schedule indicating when a next iteration of wear-leveling needs to be performed on the X3D memory, and/or wherein the memory unit adjacent to the last memory unit of the first section of memory units is at least one of the first memory unit of the second section of memory units or an empty memory unit, and/or wherein relocating the data stored in the first memory unit of the first section of memory units to the memory unit adjacent to the last memory unit of the first section of the memory units comprises relocating the data stored in the first memory unit of the first section of memory units to a location of the first memory unit of the second section of memory units, and/or wherein relocating the data stored in the first memory unit of the second section of memory units to the memory unit adjacent to the last memory unit of the second section of memory units comprises relocating the data stored in the first memory unit of the second section of memory units to a location of the first memory units of the first section of memory units, and/or wherein an empty memory unit is located between the last memory unit of the second section of memory units and the first memory unit of the first section of memory units, wherein relocating the data stored in the first memory unit of the first section of memory units to the memory unit adjacent to the last memory unit of the first section of memory units comprises relocating the data stored in the first memory unit of the first section of memory units to the location of the first memory unit of the second section of memory units, and wherein relocating the data stored in the first memory unit of the second section of memory units to the memory unit adjacent to the last memory unit of the second section of memory units comprises relocating, by the processor, the data stored in first memory unit of the second section of memory units to the empty memory unit, and erasing, by the processor, the data stored in the first memory unit of the first section of memory units such that the first memory unit of the first section of memory units becomes the empty memory unit, and/or wherein the first section of memory units comprises a plurality of SMUs configured to store a first type of data, wherein the second section of memory units comprises a plurality of LMUs configured to store a second type of data, wherein the X3D memory further comprises a third section of memory units, and wherein the third section of memory units comprises a plurality of medium memory units (MMUs) configured to store a third type of data.

In another example embodiment, the disclosure includes an X3D memory system, comprising a plurality of SMUs stored in contiguous locations in the X3D memory and configured to store data of a first type, a plurality of LMUs stored in contiguous locations in the X3D memory and configured to store data of a second type, and at least one processor that detects a trigger event, wherein the at least one processor, in response to the trigger event, relocates data stored in a first SMU of the plurality of SMUs to a memory unit adjacent to a last SMU of the plurality of SMUs, wherein the plurality of SMUs are stored in contiguous locations in the X3D memory system, and relocates data stored in a first LMU of the plurality of LMUs to a memory unit adjacent to a last LMU of the plurality of LMUs, wherein the plurality of LMUs are stored in contiguous locations in the X3D memory system. In some embodiments, the disclosure further includes further comprising one or more empty memory units that are contiguously disposed in between the plurality of LMUs and the plurality of SMUs, and/or wherein the at least one processor further performs the steps of updating location data of the X3D memory to indicate that the data stored in the first SMU has been relocated to a location of the memory unit adjacent to the last SMU, and updating the location data of the X3D memory to indicate that the data stored in the first LMU has been relocated to a location of the memory unit adjacent to the last LMU, and/or wherein the data of the first type is data that has been accessed within a predetermined time period, and/or wherein each of the plurality of SMUs stores a portion of a flash translation layer (FTL) table, and/or further comprising at least one empty memory unit configured to temporarily store the data stored in the first LMU while the data in the first SMU is relocated to the memory unit adjacent to the last LMU, and/or further comprising at least one empty memory unit configured to temporarily store the data stored in the first SMU while the data in the first LMU is relocated to the memory unit adjacent to the last SMU.

In another example embodiment, the disclosure includes a hybrid memory device (HMD), comprising, an X3D memory comprising a first plurality of memory units (MUs) and a second plurality of MUs, a processor coupled to the X3D memory and configured to detect a trigger event that triggers an iteration of wear-leveling to be performed on the X3D memory, wherein data stored in a first MU of the first plurality of MUs is relocated to a MU adjacent to a last MU of the first plurality of MUs, wherein the first plurality of MUs are stored in contiguous locations in the X3D memory, wherein data stored in a first MU of the second plurality of MUs is relocated to a MU adjacent to a last MU of the second plurality of MUs, and wherein the second plurality of MUs are stored in contiguous locations in the X3D memory. In some embodiments, the disclosure further includes further comprising a secondary memory coupled to the processor and the X3D memory, wherein the X3D memory comprises data of a first type, and wherein the secondary memory comprises data of a second type, and/or further comprising a temporary memory coupled to the processor and the X3D memory, wherein the temporary memory comprises at least one of a location of the first MU of the first plurality of MUs, a location of the last MU of the first plurality of MUs, a location of the first MU of the second plurality of MUs, and a location of the last MU of the second plurality of MUs, and/or wherein the location of the first MU of the first plurality of MUs is updated after the data stored in the first MU of the first plurality of MUs is relocated to a memory unit adjacent to the last MU of the first plurality of MUs, and wherein the location of the first MU of the second plurality of MUs is updated after the data stored in the first MU of the second plurality of MUs is relocated to a memory unit adjacent to the last MU of the second plurality of MUs, and/or wherein the X3D memory comprises at least one empty memory unit, wherein the data stored in the first MU of the first plurality of MUs is written to the empty memory unit, and wherein the data stored in the first MU of the second plurality of MUs is written to the memory unit where the first MU of the first plurality of MUs was located, and/or wherein the X3D memory comprises at least one empty memory unit, wherein the data stored in the first MU of the second plurality of MUs is written to the empty memory unit, and wherein the data stored in the first MU of the first plurality of MUs is written to the memory unit where the first MU of the second plurality of MUs was located.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
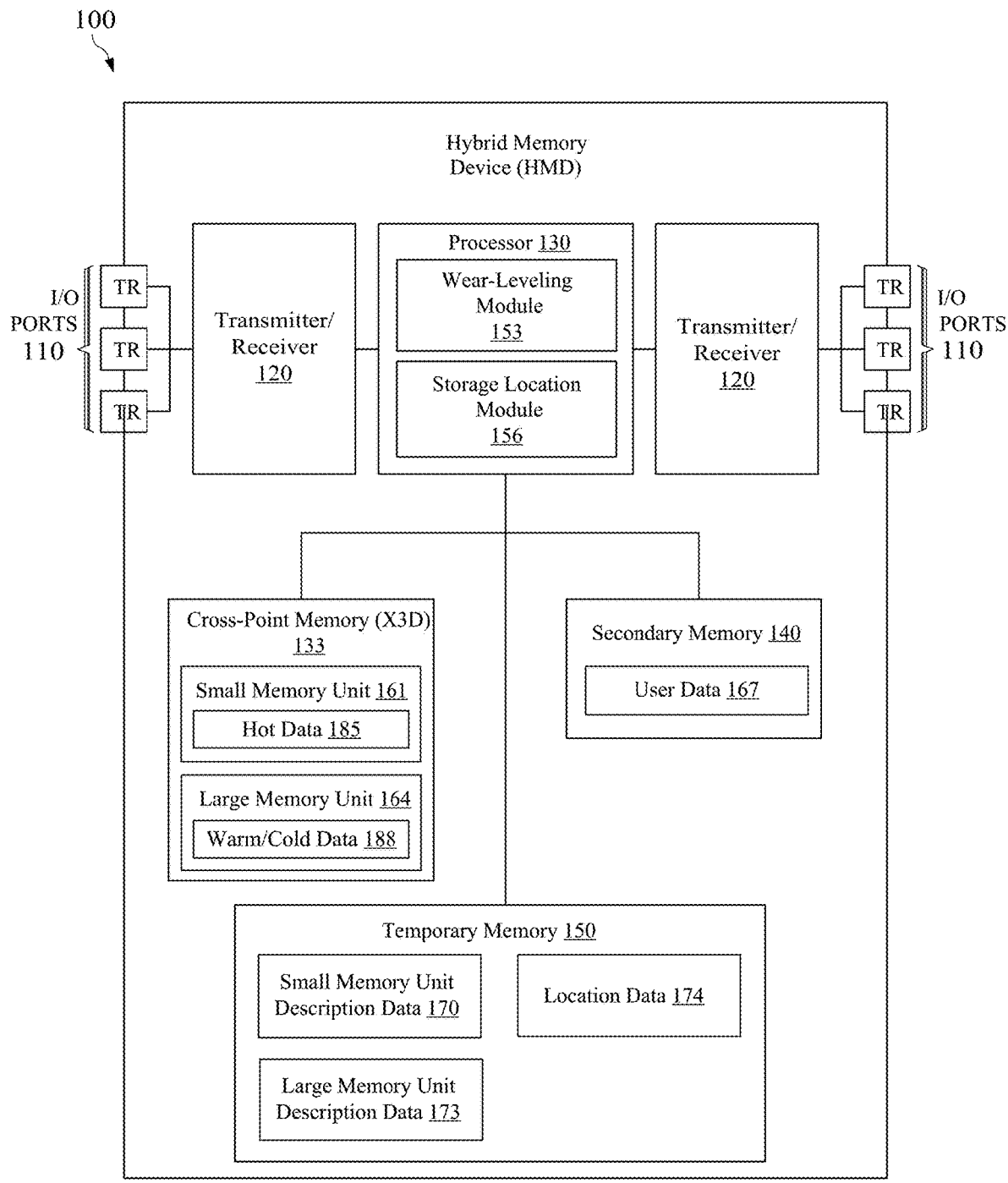
FIG. 1 illustrates an embodiment of an HMD that implements the wear-leveling embodiments described herein.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

A conventional memory system on a mobile device includes various different types of memory that each stores different types of data based on a frequency of access operations, such as reads and/or writes, that are performed on the data. A mobile device typically includes a random access memory (RAM), such as a dynamic RAM (DRAM) or a static RAM (SRAM), to store hot data. A hard drive, such as a solid-state drive or a hard disk drive, to store cold data. Some mobile devices may also include a flash memory, such as a NAND flash memory, to store warm data. Hot data generally refers to data for which access operations are carried out on a relatively frequent basis. For example, an FTL table is typically considered hot data because the FTL tables needs to be written to and updated frequently. Therefore, the FTL table is typically stored in a RAM of a mobile device because of the number of write cycles that needs to be performed on the FTL table. Warm data generally refers to data for which access operations are carried out on a less frequent basis than hot data but on a more frequent basis than cold data. For example, user data that is frequently read but not frequently written to, such as pictures or documents, may be considered warm data. Therefore, such pictures or documents are typically stored in a flash memory of a mobile device when the mobile device includes a flash memory. Cold data generally refers to data for which access operations are rarely performed. For example, user data that is rarely read and never updated, such as a document that a user read one time, may be considered cold data. Therefore, the document that is rarely accessed is typically stored in a hard drive of the mobile device. In one embodiment, a mobile device may not include a flash memory. In such an embodiment, the hard drive would store both warm and cold data.

RAMs such as DRAM and SRAM are typically used to store hot data because RAM is fast. However, RAM is relatively expensive, especially at a large capacities. RAM is also volatile in that data stored in the RAM is eventually lost when the RAM is not powered. Hard drives are orders of magnitude slower than RAM, but hard drives are very cheap and high capacity. For this reason, a majority of user data is stored in hard drives. Flash memories that store warm data are cheaper than RAM and much faster than hard drives. These differences in performance, capacity, and cost between different types of memory devices force mobile devices to have a restricted amount of hot data storage capacity, resulting in big performance penalties when the data the mobile device needs is unavailable.

X3D technology and memory improves the storage of data by increasing a data access speed at which data stored in an X3D memory can be accessed. An X3D memory includes memory cells that can be directly accessed without having to read, erase, and program other memory cells. The X3D technology thereby supports in-place-updating of memory in which new data directly overrides old data at the location of the old data. In contrast, RAM, such as DRAM, only supports out-of-place updating of memory in which new data has to be written in a new location and old data has to be marked as out of date. Therefore, the data access speed in RAM is slower than X3D memory, and RAM requires more maintenance than X3D memory. X3D technology currently does not implement a mechanism by which to differentiate between storing hot, warm, and cold data according to the physical storage locations of hot, warm, and cold data. As such, X3D technology does not implement wear-leveling on the X3D. Wear-leveling operations should be performed on the X3D memory to prevent the X3D from wearing out and becoming unusable.

Disclosed herein are embodiments directed to an HMD that comprises an X3D memory partitioned into contiguous SMUs and contiguous LMUs. The SMUs store hot data while the LMUs store warm and/or cold data. In an embodiment, the HMD is configured to perform wear-leveling on the SMUs and the LMUs by relocating data of a first SMU to a memory unit adjacent to a last SMU of the contiguous SMUs and relocating data of a first LMU to a memory unit adjacent to a last LMU of the contiguous LMUs. Wear-leveling is applied to the SMUs and LMUs to maintain a substantially equal write frequency across all memory units. This way, each SMU and LMU wears out at substantially the same rate. Embodiments of wear-leveling disclosed herein maintain the sequential order of data structure stored in the SMUs and LMUs. Wear-leveling is implemented in a manner such that all SMUs remain contiguous with each other, and all LMUs remain contiguous with each other after each iteration of wear-leveling.

FIG. 1 illustrates an embodiment of HMD 100 that implements the wear-leveling embodiments described herein. HMD 100 comprises input/output (I/O) ports 110, transceiver units (Tx/Rx) 120, a processor 130, an X3D memory 133, a secondary memory 140, and a temporary memory 150. Ports 110 are coupled to Tx/Rx 120, which may be transmitters, receivers, or combinations thereof The Tx/Rx 120 may transmit and receive data via the ports 110. Processor 130 is configured to process data. X3D memory 133, secondary memory 140, and/or temporary memory 150 may be configured to store data and instructions for implementing embodiments described herein. The HMD 100 may also comprise electrical-to-optical (EO) components and optical-to-electrical (OE) components coupled to the ports 110 and Tx/Rx 120 for receiving and transmitting electrical signals and optical signals.

The processor 130 may be implemented by hardware, software, and/or firmware. The processor 130 may be implemented as one or more central processing unit (CPU) chips, logic units, cores (e.g., as a multi-core processor), field-programmable gate arrays (FPGAs), application specific integrated circuits (ASICs), and digital signal processors (DSPs). The processor 130 is in communication with the ports 110, Tx/Rx 120, X3D memory 133, secondary memory 140, and temporary memory 150.

The processor 130 comprises a wear-leveling module 153. The processor 130 may be configured to implement the wear-leveling module 153 to execute the instructions for implementing various embodiments disclosed herein. In an embodiment, the wear-leveling module 153 may be implemented as instructions stored in one or more of the X3D memory 133, secondary memory 140, and/or temporary memory 156. The processor 130 may also implement method 300 discussed herein. The inclusion of the wear-leveling module 153 and the storage location module 156 provide an improvement to the functionality of HMD 100. The wear-leveling module 153 and the storage location module 156 also effect a transformation of HMD 100 to a different state.

The X3D memory 133 is structured and functions according to U.S. Pat. No. 8,416,609 ('609 Patent), issued Apr. 9, 2013, which is hereby incorporated by reference. In an embodiment, the X3D memory may be formed by slicing sub-microscopic layers of materials into columns. Each column contains a memory cell and a selector. The columns are connected in a structure consisting of perpendicular wires that enables the memory cells to individually address by selecting one wire on top and another wire at the bottom of the memory cell. The structure can be stacked three-dimensionally to maximize density. Each memory cell can be written to or read by variating a voltage sent to the respective selector of the memory cell. X3D technology is a simple, stackable, transistor-less design that enables a storage capacity of up to ten times more than DRAM. In addition, data stored in the X3D is more non-volatile in that data is not lost upon power off.

According to some embodiments, the X3D memory 133 is divided into two sections. The first section includes SMUs 161, and the second section is LMUs 164. The SMUs 161 are stored in contiguous locations of the X3D memory 133, and the LMUs 164 are stored in contiguous locations of the X3D memory 133. Contiguous as referred to herein means adjoining, sharing a common border, touching, next to, or together in sequence. In an embodiment, each of the SMUs 161 is configured to store hot data 185, and each of the LMUs 164 are configured store warm/cold user data 188. Hot data 185 comprises hot data, such as the FTL table. Warm/cold user data 188 comprises warm data that are more frequently accessed than the user data 167 stored in the secondary memory 140.

In an embodiment, the processor 130 is configured to dynamically allocate a certain portion of the X3D memory as SMUs 161 and another portion of the X3D as LMUs 164. In an embodiment, the processor is configured to dynamically update the size of SMUs 161 and/or the LMUs 164 as needed. For example, suppose the FTL table is stored at SMUs 161, and the size of the FTL table becomes too large to be supported by the current size of the SMUs 161. When there is empty storage space in the LMUs 164 that can be converted to an SMU 161, the processor 130 may be configured to dynamically configure one or more of the empty LMUs 164 to be SMUs 161. In this way, SMUs 161 can be expanded by allocating the empty LMUs 164 as instead being SMUs 161 to store the remainder of the FTL table.

The secondary memory 140 comprises a flash drive, such as a NAND flash memory. In an embodiment, the secondary memory 140 is configured to store user data 167, which is cold data that is relatively colder (i.e., less frequently accessed) than the data stored at SMUs 161 and LMUs 164. In an embodiment, the processor 130 may be configured to determine whether to write data to the X3D memory 133 or the secondary memory 140 based on an estimated frequency of access of the data. For example, if a user is trying to save a document to the HMD, and the document is estimated to be a document that the user will likely never access again, the storage location module 156 will store the document in user data 167 instead of warm/cold user data 188 or hot data 185.

Temporary memory 150 may be one or more disks, tape drives, or solid-state drives and may be used to store SMU description data 170, LMU description data 173, and location data 174. Temporary memory 150 may be volatile and non-volatile and may be read-only memory (ROM), RAM, ternary content-addressable memory (TCAM), a DRAM, and SRAM. SMU description data 170 comprises data describing a size of the SMUs 161, an accessible size of the SMUs 161, a wear-leveling size of the SMUs 161, locations of the SMUs 161, and/or identifications of data stored at the SMUs 161. The size of the SMUs 161 may indicate in bytes (B) a size of SMUs 161 is in the X3D memory 133. The accessible size of the SMUs 161 indicates a smallest read/write accessible area of the SMUs 161. For example, the read/write accessible size of the SMUs 161 may be 64 B because 64 bytes of the SMUs 161 may need to be accessed at one time to perform a read and/or write operation. The wear-leveling size of the SMUs 161 indicates a smallest accessible area of the SMUs 161 for purposes of wear-leveling. For example, the wear-leveling size of the SMUs 161 may be 4 kB because 4 kB of the SMUs 161 may need to be accessed at one time to perform a wear-leveling operation, as disclosed herein. The locations of the SMUs 161 may indicate location identifiers for the memory cells in the SMUs 161. The identifications of data stored at the SMUs 161 may identify data that is stored in the SMUs 161.

LMU description data 173 comprises data describing a size of the LMUs 164, an accessible size of the LMUs 164, a wear-leveling size of the LMUs 164, locations of the LMUs 164, and/or identifications of data stored at the LMUs 164. The size of the LMUs 164 may indicate a size of the LMUs4 164 in B. The accessible size of the LMUs 164 indicates a smallest read/write accessible area of the LMUs 164. For example, the read/write accessible size of the LMUs 164 may be 4 kB because 4 kB of the LMUs 164 may need to be accessed at one time to perform a read and/or write operation. The wear-leveling size of the LMUs 164 indicates a smallest accessible area of the LMUs 164 for purposes of wear-leveling. For example, the wear-leveling size of the LMUs 164 may be 4 kB because 4 kB of the LMUs 164 may need to be accessed, at one time, to perform a wear-leveling operation, as disclosed herein. The locations of the LMUs 164 may indicate location identifiers for the memory cells in the LMUs 164. The identifications of data stored at the LMUs 164 may identify data that is stored in the LMUs 164.

Location data 174 includes locations of data segments stored at one or more of the SMUs 161 and/or the LMUs 164. For example, location data 174 includes one or more locations of memory cells or groups of memory cells that store one or more data segments of a file. In an embodiment, location data 174 only stores location information for the memory cell, SMU 161, or LMU 164 storing the first data segment of an ordered file. For example, suppose a movie file contains eleven data segments stored sequentially and contiguously in LMUs 164. In this case, location data 174 may only store the location of the LMU 164 storing the first of the eleven data segments of the movie file. In an embodiment, location data 174 stores location information for each of the eleven data segments of the movie file. As another illustrative example, suppose the FTL table, which is an ordered table, includes 200 segments stored in contiguous SMUs 161. In this case, location data 174 may only store the location of the SMU 171 storing the first of the 200 segments of the FTL table. In an embodiment, location data 174 stores location information for each of the 200 segments of the FTL table.

In an embodiment, SMU description data 170, LMU description data 173, and location data 174 may be stored in one or more of either the X3D memory 133, secondary memory 140, and/or temporary memory 150. HMD 100 may include other means for implementing the wear-leveling module 153 and/or method 300 selected for execution, and to store instructions and data that are read during program execution.

In an embodiment, wear-leveling is performed on the X3D memory 133 across both SMUs 161 and LMUs 164. In an iteration of wear-leveling, data stored at a first SMU 161 is relocated to a memory unit after a last SMU 161, and data stored at a first LMU 164 is relocated to a memory unit after a last LMU 164. The switching of hot and cold data results in the first SMU 161 switching physical locations with the first LMU 164 in the X3D memory 133. Since the SMUs 161 store hot data and the LMUs 164 store cold data, the wear-leveling process results in the switching of hot and cold data. This helps to ensure that the locations in X3D memory 133 that store hot and the locations in X3D memory 133 that store cold data are accessed at a substantially equal frequency throughout the lifetime of the X3D memory 133. Such a method of wear-leveling maintains the order of data structures stored in SMUs 161 and LMUs 164. While each iteration of wear-leveling changes the absolute locations of data, the relative locations of ordered data in the SMUs 161 and the LMUs 164. In addition, the methods of wear-leveling disclosed herein maintain the contiguous nature of the SMUs 161 and the LMUs 164.

In an embodiment, X3D memory 133 includes one or more empty memory units. An empty memory unit does not store any data and may not be configured as either an SMU or an LMU. In an embodiment, the empty memory units may be configured as either an SMU or an LMU but still does not store data. In an iteration of wear-leveling on an X3D memory 133 with one or more empty memory units, either a first SMU 161 or a first LMU 164 is relocated to the empty memory unit. Then the empty memory is relocated to the location of either either the first SMU 161 or the first LMU 164. The empty memory unit is involved in the wear-leveling process as data is written to and from the empty memory to another SMU or LMU during each iteration of wear-leveling.

To facilitate the relocation process of wear-leveling, the X3D memory 133 can comprise an empty buffer after each memory unit section, which is reserved for the write operation when swapping memory units. It is understood that by programming and/or loading executable instructions onto the HMD 100, at least one of the processor 130, X3D memory 133, secondary memory 140, and/or temporary memory 150 are changed, transforming the HMD 100 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable and that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC is a particular machine or apparatus, likewise a computer that has been programmed and/or loaded with executable instructions (e.g., a computer program product stored in a non-transitory medium/memory) may be viewed as a particular machine or apparatus.

Figure 2:
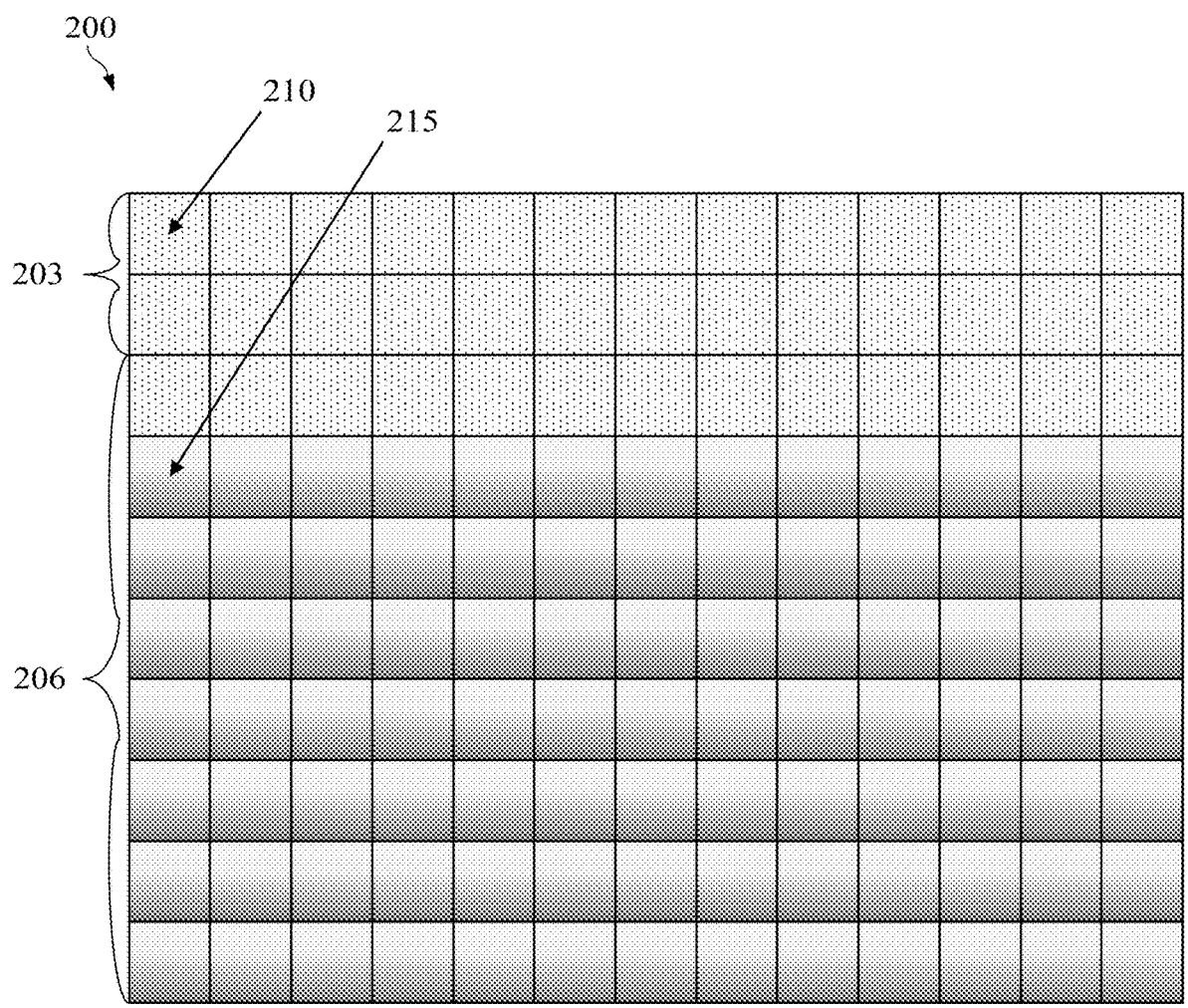
FIG. 2 illustrates an embodiment of an X3D memory.

FIG. 2 illustrates an embodiment of an X3D memory 200. In an embodiment, the X3D memory 200 is similar to X3D memory 133. As shown in FIG. 2, X3D memory 200 comprises a section 203 for SMUs and a section 206 for LMUs. The section 203 for SMUs comprises a plurality of SMUs 210, such as SMUs 161. The section 206 for LMUs comprises a plurality of LMUs 215, such as LMUs 164. As shown in FIG. 2, the SMUs 210 are stored in contiguous locations of section 203 for SMUs 210 in the X3D memory 200. Similarly, the LMUs 164 are stored in contiguous locations of section 206 for LMUs 215 in the X3D memory 200. The SMUs 210 are contiguous with one another such that each SMU 210 is adjacent to at least one other SMU 210. The LMUs 215 are contiguous with one another such that each LMU 215 is adjacent to at least one other LMU 215. In an embodiment, the section 203 for SMUs 210 is also contiguous with the section 206 for LMUs 215 such that there are no empty memory units between the last SMU 210 and the first LMU 215. In an embodiment, there may be one or more empty memory units between the last SMU 210 and the first SMU 215.

In an embodiment, a smallest accessible unit in an X3D memory is 16 B. The SMUs 210 may be configured such that a smallest accessible unit for read and/or write purposes is 64 B, or any other multiple of 16 B. The LMUs 215 may be configured such that a smallest accessible unit for read and/or write purposes is 4 kB, or any other multiple of 4 kB. The SMUs 210 may be configured such that a smallest accessible unit for wear-leveling purposes is 4 kB, or any other multiple of 4 kB. Similarly, the LMUs 215 may be configured such that a smallest accessible unit for wear-leveling purposes is 4 kB, or any other multiple of 4 kB. In an embodiment, the smallest accessible unit for wear-leveling purposes should be the same for SMUs 210 and LMUs 215 so the wear-leveling is performed evenly. For example, the SMU 210 stores the FTL table and other frequently accessed data, and the LMU stores user data and other less frequently accessed data. For improving wear-leveling processes, the FTL table entries in the SMU 210 can be combined into larger groups to be the same size as an LMU (4 kB). The X3D 200 shown in FIG. 2 only includes SMUs 210 and LMUs 215. However, it should be appreciated that X3D 200 may otherwise include other types of memory units or may have memory units or cells that are left blank and unassigned to a specific type of memory unit.

While X3D memory 200 only shows section 203 for SMUs and section 206 for LMUs, X3D memory 200 may also include a section for one or more MMUs or empty memory units. The MMUs are memory units configured to store warm data. MMUs may be contiguous with each other and may be located before the SMUs, between the SMUs and the LMUs, or after the LMUs. The empty memory units are memory units that are not particularly configured to store hot, cold, or warm data, and do not store data. The empty memory units may also be contiguous with each other and located before the SMUs, between the SMUs and the LMUs, or after the LMUs. X3D memory may also include any number of sections for SMUs, LMUs, MMUs, or empty memory units. For example, X3D memory 200 may include two sections for SMUs, 1 section for MMUs, 3 sections for LMUs, and 2 sections for empty memory units. Therefore, X3D memory 200 may be configured to store various types of data (e.g., temperatures of data) so long as the memory units that store a particular type of data are in a logically contiguous area of the memory. Embodiments of the present disclosure are directed to wear-leveling between the various sections of memory units while maintaining data structures and the order of data intact as wear-leveling is performed.

While X3D memory 200 shows that the section 203 for SMUs is smaller than the section 206 for LMUs, it should be appreciated that section 203 for SMUs may be larger than or the same size as section 206 for LMUs. An X3D memory 200 may include any number of memory units to store hot, warm, and cold data. The size of section of the sections that store SMUs, MMUs, and LMUs may vary.

Figure 3:
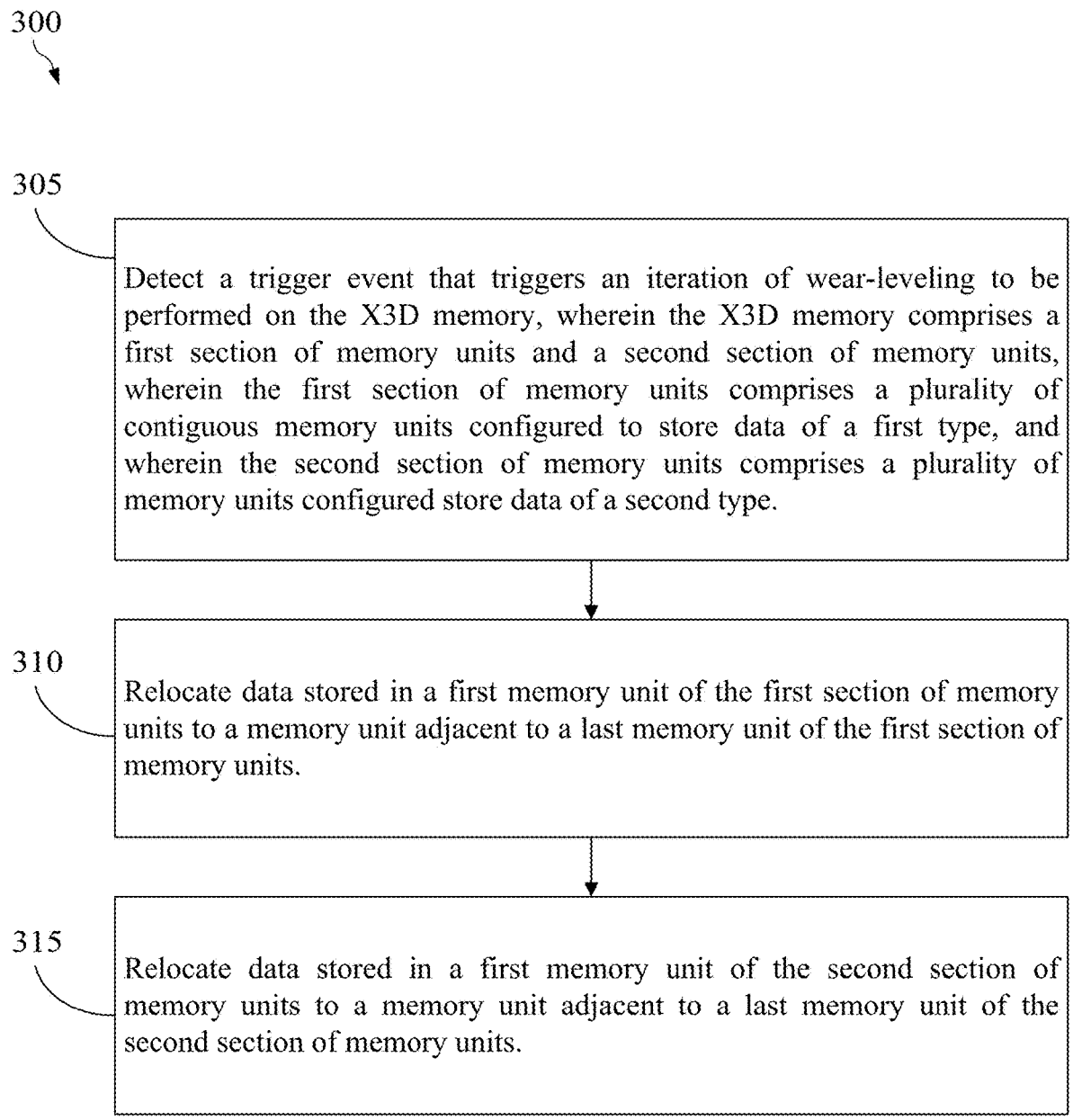
FIG. 3 shows a method 300 for wear-leveling in an X3D memory.

FIG. 3 shows a method 300 for wear-leveling in an X3D memory. The method 300 for wear-leveling in an X3D memory may be implemented when a trigger event is detected or upon a pre-determined schedule. In an embodiment, the X3D is similar to X3D 200. At block 305, a trigger event for initiating an iteration of a wear-leveling process on the X3D is detected. For example, the processor 130 detects the trigger event. The X3D memory comprises a first section of memory units and a second section of memory units. The first section of memory units and the second section of memory units may be SMUs, LMUs, or MMUs. The first section of memory units comprises a plurality of contiguous memory units configured to store data of a first type, and the second section of memory units comprises a plurality of memory units configured store data of a second type. In an embodiment, the various types of data may be hot data, warm data, and cold data. The trigger event for initiating an iteration of the wear-leveling process on the X3D can occur when a fixed frequency of accesses to one or more of the plurality of SMUs reaches a pre-determined threshold. For example, the wear-leveling process may be triggered after a number of write operations on one of the SMUs/LMUs, or the whole SMU/LMU contiguous memory area has exceeded the pre-determined threshold. In an embodiment, the trigger event may be based on a dynamic equation factoring in a number of operations, environmental factors, preset durations, and the like. In an embodiment, the trigger event may be based on a wear-leveling schedule that has been pre-configured and stored in an HMD such that an iteration of the wear-leveling process begins according to the wear-leveling schedule.

At block 310, data stored in a first memory unit of the first section of memory units is relocated to a memory unit adjacent to a last memory unit of the first section of memory units. For example, data stored in a first SMU of a plurality of SMUs is relocated to a memory unit adjacent to the last SMU of the plurality of SMUs. For example, the processor 130 may configure the X3D memory 133 to relocate data stored in a first SMU of SMUs 161 to a memory unit adjacent to the last SMU of SMUs 161. The SMUs are stored in contiguous locations in an X3D memory. At block 315, data stored in a first memory unit of the second section of memory units is relocated to a memory unit adjacent to a last memory unit of the second section of memory units. For example, data stored in a first LMU of a plurality of LMUs is relocated to a memory unit adjacent to a last LMU of the LMUs. For example, the processor 130 may configure the X3D memory 133 to relocate cold data stored in the first LMU of the LMUs 164 to a memory unit adjacent to the last LMU of the LMUs 164. The LMUs are also stored in contiguous locations in the X3D memory.

In an embodiment, wear-leveling is performed on an X3D memory by relocating data on an SMU to a memory unit that is immediately after the last SMU in a clockwise manner. Suppose the size of the SMU, or the number of actual SMUs in the X3D memory, is represented by S(SMU), and the size of the LMU, or the number of actual LMUs in the X3D memory, is represented by S(LMU). For example, if there are 5 SMUs, then S(SMU) is 5. In this case where S(SMU)=5, a first iteration of wear-leveling performed on the SMU relocates data stored in the first SMU to the memory unit right after the fifth SMU. When the memory unit immediately after the fifth SMU is the first LMU, then the data stored at the first LMU may be temporarily written to a buffer memory while the data stored at the first SMU is written to the location of the first LMU. When the memory unit immediately after the fifth SMU is an empty memory unit, then the data previously stored at the first SMU may be written to the location of the empty memory unit. Therefore, wear-leveling is performed by moving data from an SMU to S(SMU) memory units ahead. In other words, a memory unit at the beginning of the contiguous location is moved to the end of the contiguous location. This method maintains the same type of unit in a contiguous location, but shifts the overall location over one unit space while shifting the order of the units.

The LMU must also be shifted over to the memory unit right after the last LMU. In terms of timing, the SMU can be relocated before the corresponding LMU, or vice versa. In this way, the wear-leveling process disclosed herein switches the storing of hot data and cold data (the cold data may include warm data as well) on different locations of the X3D. Switching storage locations of hot and cold data helps ensure that all of the memory units in an X3D memory are accessed a substantially equal number of times, thus preventing some memory units from deteriorating before other memory units. In various embodiments, the memory unit storing critical data may receive relocation priority in the process. Furthermore, the wear-leveling process can occur in the background of the mobile device operations during idle times, or, in some instances, be performed in the foreground of the operations.

Figure 4A:
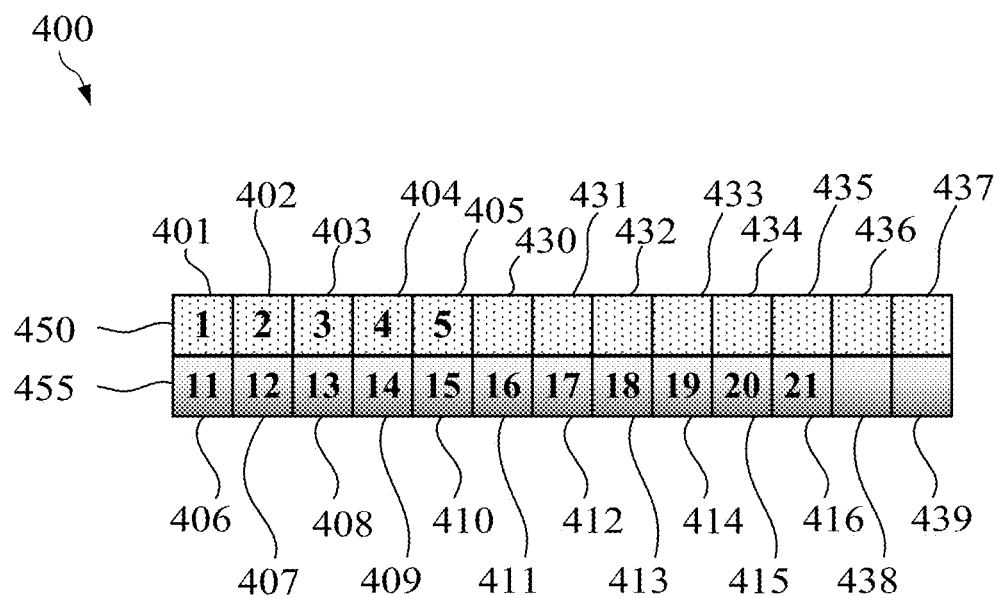
FIGS. 4A and 4B illustrate representations of an initial state of an X3D memory before wear-leveling has been performed on the X3D memory.
Figure 4B:
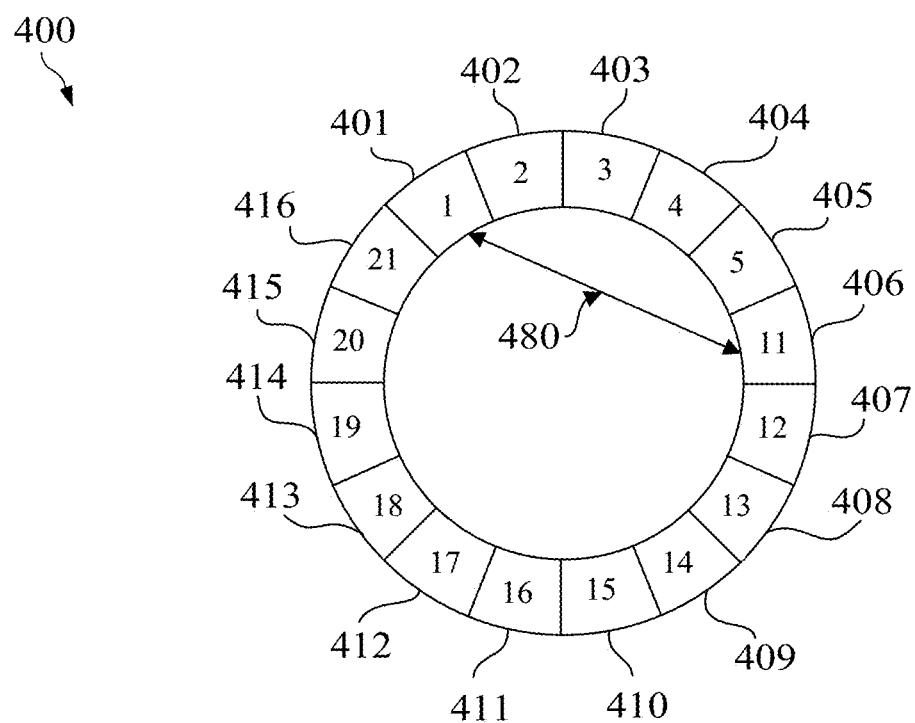

FIGS. 4A to 4B illustrate representations of an initial state of an X3D memory 400 before wear-leveling has been performed on the X3D memory 400. FIG. 4A shows a grid representation of the initial state of the X3D memory 400. X3D memory 400 is similar to X3D memory 200, except the grid representation of X3D memory 400 includes only one row (or section) 450 of memory units configured as SMUs and one row 455 of memory units configured as LMUs are shown. As should be appreciated, any number of memory units may be configured as SMUs and/or LMUs in X3D memory 400, as long as the SMUs are contiguous with one another and the LMUs are contiguous with one another.

Row 450 includes an array of memory units that are each configured sequentially as SMUs 401 to 405. In an embodiment, SMUs 401 to 405 are each similar to SMU 210. As shown in FIG. 4A, SMUs 401 to 405 each respectively stores data segments 1 to 5 of a file. SMU 401 stores data segment 1, SMU 402 stores data segment 2, SMU 403 stores data segment 3, SMU 404 stores data segment 4, and SMU 405 stores data segment 5. For example, data segments 1 to 5 represent sequential data segments of an ordered FTL table (hot data). Row 450 also includes an array of empty memory units that are each configured as SMUs 430 to 437. In an embodiment, SMUs 430 to 437 are similar to SMU 210 and do not store any data. As should be appreciated, X3D memory 400 may include any number of SMUs so long as they are arranged in a contiguous manner.

Row 455 includes the array of memory units that are each configured sequentially as LMUs 406 to 416. In an embodiment, LMUs 406 to 416 are similar to LMU 215. As shown in FIG. 4A, LMUs 406 to 416 each respectively stores data segments 11 to 21 of a file. LMU 406 stores data segment 11, LMU 407 stores data segment 12, LMU 408 stores data segment 13, LMU 409 stores data segment 14, LMU 410 stores data segment 15, LMU 411 stores data segment 16, LMU 412 stores data segment 17, LMU 413 stores data segment 18, LMU 414 stores data segment 19, LMU 415 stores data segment 20, and LMU 416 stores data segment 21. For example, data segments 11 to 21 represent sequential data segments of a movie file. Row 455 also includes an array of empty memory units that are each configured as LMUs 438 to 439. In an embodiment, LMUs 438 to 439 are similar to LMU 215 and do not store any data. As should be appreciated, X3D memory 400 may include any number of SMUs so long as they are arranged in a contiguous manner.

As shown in FIG. 4A, row of 450 includes the array of memory units configured as SMUs 401 to 405 that respectively store data segments 1 to 5 and empty SMUs 430 to 437. Row 455 includes the array of memory units configured as LMUs 406 to 416 that respectively store data segments 11 to 21 and empty LMUs 438 to 439. SMUs 401 to 405 and SMUs 430 to 437 are contiguous with each other such that they are adjacent to one another in row 450, and there are no LMUs interleaved between any of the SMUs. Similarly, LMUs 406 to 416 and LMUs 438 to 439 are contiguous with each other such that they are adjacent to one another in row 455, and there are no SMUs interleaved between any of the LMUs. In an embodiment, the first iteration of wear-leveling comprises relocating the first SMU (e.g., SMU 401) to a memory unit after a last empty SMU (e.g., SMU 437) and relocating the first LMU 406 to a memory unit after the last empty LMU (e.g., LMU 439).

FIG. 4B shows a circular representation of the initial state of the X3D memory 400 with arrow 480 illustrating how a first iteration of wear-leveling will be performed on the X3D memory 400. The circular representation of X3D memory 400 shown in FIG. 4B is structured similar to and stores similar data segments as the grid representation of X3D memory 400 shown in FIG. 4A.

As indicated by arrow 480, the first iteration of wear-leveling comprises relocating a first SMU (e.g., SMU 401) to a memory unit after a last SMU (e.g. SMU 405) and relocating a first LMU (e.g., LMU 406) to a memory unit after the last LMU (e.g., LMU 416). X3D memory 400 shown in FIG. 4B does not include any empty SMUs or empty LMUs (although X3D memory 400 shown in FIG. 4A does). However, the last contiguous SMU is considered the last SMU, regardless of whether the SMU stores data or not. Similarly, the last contiguous LMU is considered the last LMU, regardless of whether the LMU stores data or not. Therefore, although FIG. 4B shows that data is to be moved from SMU 401 to a memory unit after SMU 405, the data may be actually moved to a memory unit after the last SMU of the plurality of contiguous SMUs regardless of whether the SMU stores data or not. Similarly, while FIG. 4B shows data to be moved from LMU 406 to a memory unit after LMU, the data may be actually moved to a memory unit after the last LMU of the plurality of contiguous LMUs regardless of whether the LMU stores data or not.

For example, relocating SMU 401 to a memory unit after SMU 405 comprises writing the data segment 1 to a temporary buffer, and then erasing data segment 1 from the location of SMU 401. Once data segment 1 is erased from the location of SMU 401, the previous location of SMU 401 becomes an empty memory unit. Data segment 11 may then be written from LMU 406 to the empty memory unit. Once the data segment 11 is written to empty memory unit, data segment 11 may be erased from LMU 406 such that the location of LMU 406 also becomes another empty memory unit. Data segment 1 may then be written from the temporary buffer to the empty memory unit where LMU 406 was previously located.

As another illustrative example in which there are one or more empty memory units already present in X3D memory between LMU 416 and SMU 401, wear-leveling may be performed without the use of a temporary buffer. First, data segment 11 may be written from LMU 406 to the empty memory unit, such that the previous location of LMU 406 becomes an empty memory unit. Then, data segment 1 from SMU 401 may be written from SMU 401 to the empty memory unit where LMU 406 was previously located. Data segment 1 may be erased from SMU 401 such that there is still an empty memory unit between the SMUs and the LMUs in the X3D memory 400 after a first iteration of wear-leveling.

Such an embodiment of wear-leveling amounts to switching the location of the first SMU 401 with the location of the first LMU 406. Arrow 480 points to SMU 401 and LMU 406, which will both be relocated during the first iteration of wear-leveling. After the first iteration of wear-leveling, the locations of SMU 401, storing hot data segment 1, and LMU 406, storing warm/cold data segment 11, will be swapped in X3D memory 400. Therefore, the embodiments of wear-leveling disclosed herein that switch locations of SMU 401 and LMU 406 facilitate ensuring that the locations of SMU 401 and LMU 406 are accessed at a similar frequency throughout the lifetime of X3D memory 400. In an embodiment, location data (e.g., location data 174) associated with the SMUs and LMUs may be updated to reflect the first iteration of wear-leveling. For example, the new locations of SMU 401 and/or LMU 406 may be updated after the first iteration of wear-leveling is complete.

Figure 5A:
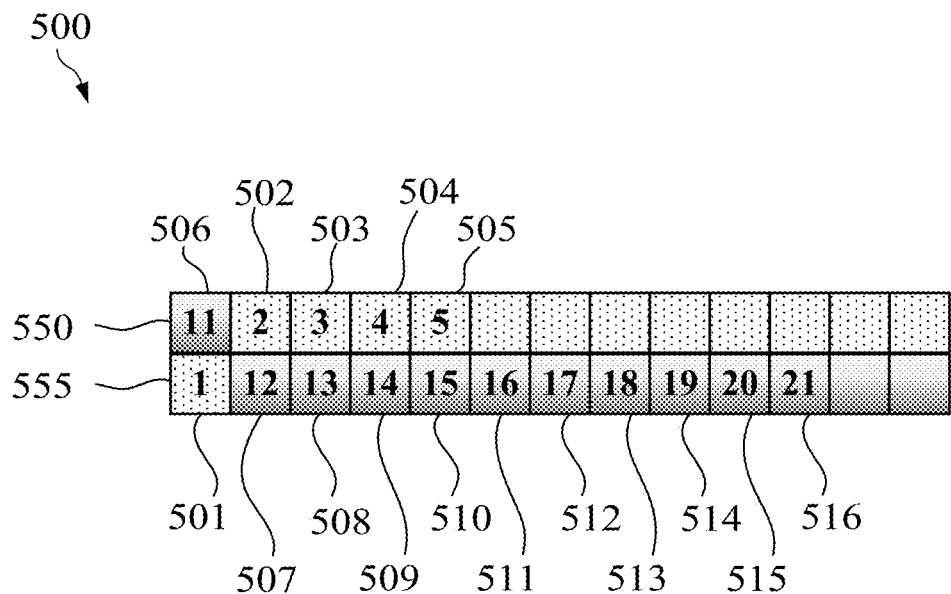
FIGS. 5A and 5B illustrate representations of the X3D memory after a first iteration wear-leveling has been performed on the X3D memory.
Figure 5B:
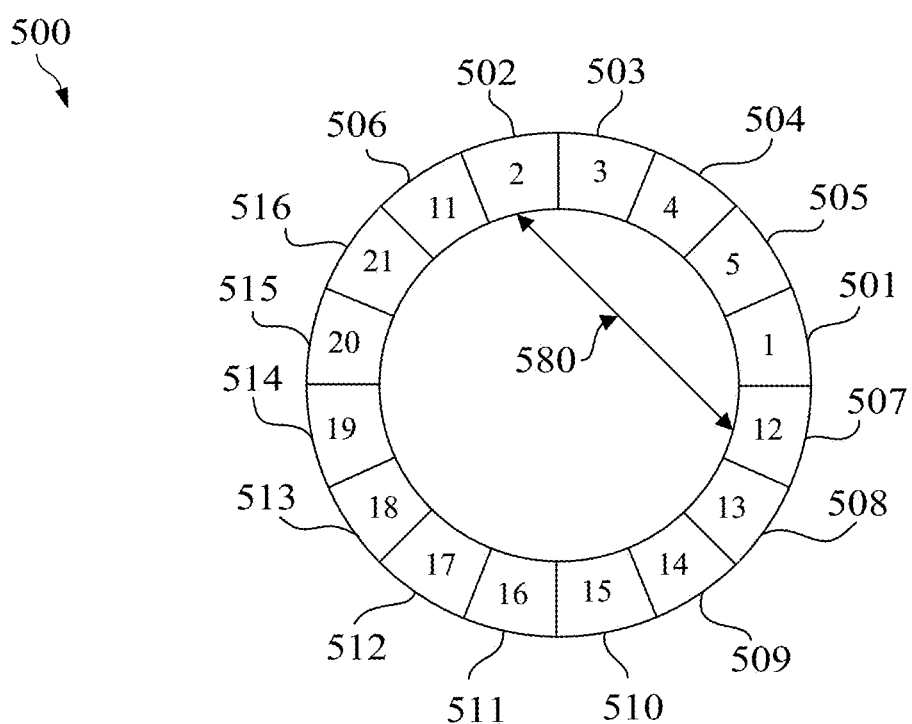

FIGS. 5A and 5B illustrate representations of an X3D memory 500 after the first iteration of wear-leveling has been performed on the X3D memory 400. FIG. 5A shows a grid representation of the X3D memory 500. The grid representation of X3D memory 500 is structured similar to the grid representation of X3D memory 400, except that in X3D memory 500, the memory unit that stores data segment 1 (e.g., SMU 501) and the memory unit that stores data segment 11 (e.g., SMU 506) have switched locations.

Row 550 includes an array of memory units that each configured sequentially as SMUs 502, 503, 504, 505, and 501. SMUs 501 to 505 are similar to SMUs 401 to 405 and store similar data segments, respectively, except the absolute location of SMU 501 has changed. Row (or section) 555 also includes an array of memory units that are each configured sequentially as LMUs 507, 508, 509, 510, 511, 512, 513, 514, 515, 516, and 506. LMUs 506 to 516 are similar to LMUs 406 to 416 and store similar data segments, respectively, except the absolute location of SMU 506 has changed. As shown in FIG. 5, row 550 may include any additional number of empty SMUs, and row 555 may include any additional number of empty LMUs.

After the first iteration of wear-leveling is performed on X3D memory 400 to result in X3D memory 500, the first memory unit in row 550 is now configured as LMU 406 storing data segment 11 (warm/cold data). Similarly, the first memory unit in row 555 is now configured as SMU 501 storing data segment 1 (hot data). In effect, the first iteration of wear-leveling has swapped the locations of SMU 401 and LMU 406 to result in the post wear-leveling locations of SMU 501 and SMU 506. The switching of locations of SMU 401 with LMU 406 results in the swapping of storage locations of hot data and warm/cold data. This swapping of storage locations of hot data and cold data serves to prevent memory cells associated with storing hot data from deteriorating (or wearing out) faster memory cells associated with storing cold data deteriorate. In this way, the wear-leveling schemes disclosed herein provide for a way to configure an X3D memory 500 to maintain a substantially equal read and write frequency across all memory units, both SMUs and LMUs.

FIG. 5B shows a circular representation of the X3D memory 500 after the first iteration of wear-leveling has been performed on the X3D memory 400 with arrow 580 illustrating how a second iteration of wear-leveling will be performed on the X3D memory 500. The circular representation of X3D memory 500 shown in FIG. 5B is structured similar to and stores similar data segments as the grid representation of X3D memory 500 shown in FIG. 5A, except that in X3D memory 500, the memory unit that stores data segment 1 (e.g., SMU 501) and the memory unit that stores data segment 11 (e.g., SMU 506) have switched locations. As shown in FIG. 5B, SMUs 502-505 remain in their original memory unit locations, while SMU 501 has moved from the beginning of the array of SMUs to the end of the array of SMUs. Similarly, LMUs 507 to 516 remain in their original memory unit locations, while LMU 506 has moved from the beginning of the array of LMUs to the end of the array of LMUs.

After the first iteration of wear-leveling has been performed to create X3D memory 500, the array of memory units configured as SMUs remain contiguous to each other in that the SMUs are still adjacent to each other without any interleaving LMUs. Similarly, the array of memory units configured as LMUs also remain contiguous to each other in that the LMUs are still adjacent to each other without any interleaving SMUs.

The change in absolute locations (as shown in FIG. 5A) does not alter the relative locations of the SMUs and LMUs in a circular fashion because SMUs and LMUs are not interleaved in between each other. The order of the data segments stored in the array of SMUs are maintained relative to the locations of the other SMUs in a circular fashion. For example, the order of the data segments stored at the SMUs is now 2, 3, 4, 5, and 1. When the HMD knows the location of data segment 1, the HMD knows that the remaining SMUs store the remainder of data segments 1-5 sequentially in a circular fashion since all SMUs are contiguous, and the order of the SMUs storing the sequential data segments has not been disrupted. In an embodiment, a processor (e.g., processor 130) coupled to X3D memory 500 may be configured to update a location data (e.g., location data 174) each time an iteration of wear-leveling has been performed on the X3D memory 500. For example, before the first iteration of wear-leveling has been performed on X3D memory 500, the location data indicated that the location of SMU 401 was the location of the memory unit after the last LMU 416. After the first iteration of wear-leveling has been performed on X3D memory 500, the processor updates the location data to indicate that the location of SMU 501 is the memory unit after SMU 505. In this way, the location of the first SMU, last SMU, first LMU, and/or last LMU may be stored and later searched for. For example, the processor may search the location data to identify the location of SMU 501 as the location of data segment 1, and circle around to the next SMU to find the remaining sequence of data segments 2-5. Accordingly, the wear-leveling methods and systems described herein maintain the order of the data structure stored in data segments 1-5. A similar mechanism can be used to update the location data of data segments 11-21 stored at LMUs 506 to 516.

As indicated by arrow 580, a second iteration of wear-leveling comprises relocating a first SMU (e.g., SMU 502) to a memory unit after a last SMU (e.g. SMU 501) and relocating a first LMU (e.g., LMU 507) to a memory unit after the last LMU (e.g., LMU 506). Such an embodiment of wear-leveling amounts to switching the location of the first SMU 502 with the location of the first LMU 507. Arrow 580 points to SMU 502 and LMU 507 in X3D memory 500 that will be relocated during the second iteration of wear-leveling. After the second iteration of wear-leveling, the locations of SMU 502, storing hot data segment 2, and LMU 507, storing warm/cold data segment 12, will be swapped in X3D memory 500. Therefore, the embodiments of wear-leveling disclosed herein that switch locations of SMU 502 and LMU 507 facilitate ensuring that the locations of SMU 502 and LMU 507 are accessed at a similar frequency throughout the lifetime of X3D memory 500. In an embodiment, location data (e.g., location data 174) associated with the SMUs and LMUs may be updated to reflect the second iteration of wear-leveling. For example, the new locations of SMU 502 and/or LMU 507 may be updated after the second iteration of wear-leveling is complete.

Figure 6A:
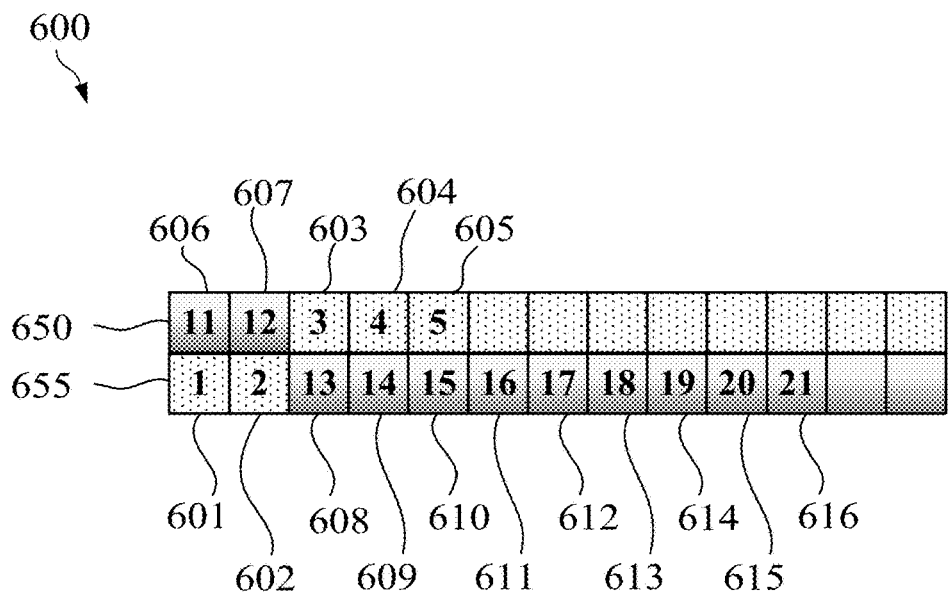
FIGS. 6A and 6B illustrate representations of the X3D memory after a second iteration wear-leveling has been performed on the X3D memory.
Figure 6B:
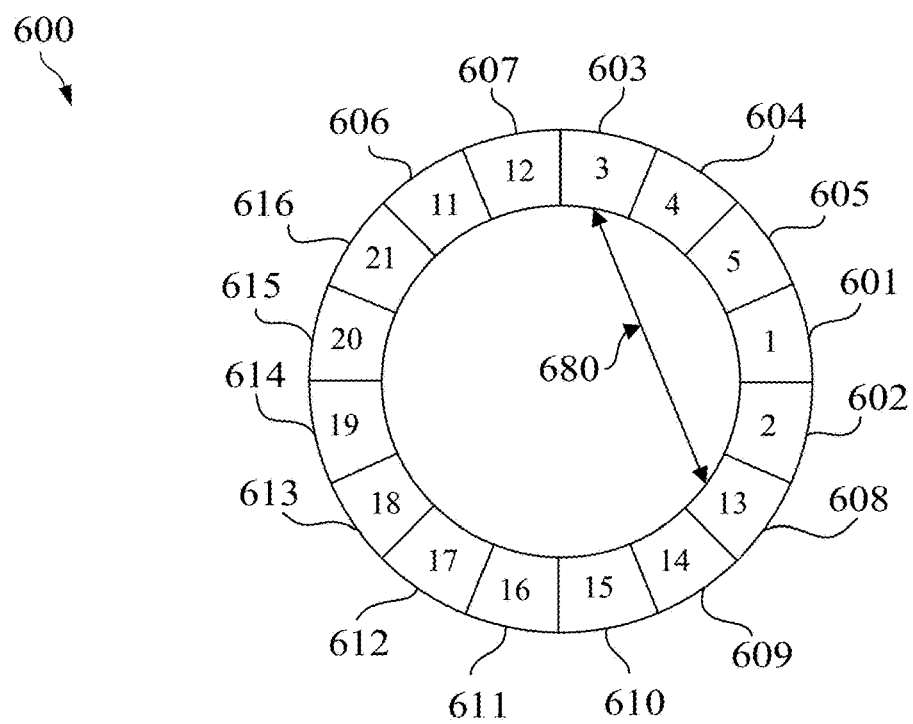

FIGS. 6A and 6B illustrate representations of an X3D memory 600 after a second iteration of wear-leveling has been performed on the X3D memory 400. FIG. 6A shows a grid representation of the X3D memory 600. The grid representation of X3D memory 600 is similar to the grid representation of X3D memory 500, except that in X3D memory 500, the memory unit that stores data segment 2 (e.g., SMU 602) and the memory unit that stores data segment 12 (e.g., SMU 607) have switched locations.

X3D memory 600 includes an array of memory units that each configured sequentially as SMUs 603, 604, 605, 601, and 602. SMUs 601 to 605 are similar to SMUs 501 to 505 and store similar data segments, respectively, except that the absolute location of SMU 602 has changed. X3D memory 600 also includes an array of memory units that are each configured sequentially as LMUs 608, 609, 610, 611, 612, 613, 614, 615, 616, 606, and 607. LMUs 606 to 616 are similar to LMUs 506 to 516 and store similar data segments, respectively, except that the absolute location of LMU 607 has changed. As shown in FIG. 6, row (or section) 650 may include any additional number of empty SMUs, and row 655 may include any additional number of empty LMUs.

After the next iteration of wear-leveling is performed on X3D memory 500 to result in X3D memory 600, the second memory unit in row 650 is now configured as LMU 607 storing data segment 12 (warm/cold data). Similarly, the second memory unit in row 655 is now configured as SMU 602 storing data segment 2 (hot data). In effect, the second iteration of wear-leveling swaps the locations of SMU 402 and LMU 407 (see FIG. 4) to result in the post wear-leveling locations of SMU 602 and SMU 607.

FIG. 6B shows a circular representation of the X3D memory 600 after another iteration of wear-leveling has been performed on the X3D memory 500 with an arrow 680 illustrating how a third iteration of wear-leveling will be performed in X3D memory 600. The circular representation of X3D memory 600 shown in FIG. 6B is structured similar to and stores similar data segments as the circular representation of X3D memory 600 shown in FIG. 6A, except that in X3D memory 600, the memory unit that stores data segment 2 (e.g., SMU 602) and the memory unit that stores data segment 12 (e.g., SMU 607) have switched locations.

As shown in FIG. 6B, SMUs 603-605 remain in their original memory unit locations, and SMU 601 remains moved from the beginning of the array of SMUs to the end of the array of SMUs. However, SMU 602 has moved from the beginning of the array of SMUs to the end of the array of SMUs. The order of the array of memory units configured as SMUs becomes SMU 603, SMU 604, SMU 605, SMU 601, and SMU 602. Similarly, LMUs 608 to 616 remain in their original memory unit locations, and LMU 606 remains moved from the beginning of the array of LMUs to the end of the array of LMUs. However, SMU 607 has moved from the beginning of the array of LMUs to the end of the array of LMUs.

After the second iteration of wear-leveling has been performed to create X3D memory 600, the array of memory units configured as SMUs remain contiguous to each other in that the SMUs are still adjacent to each other without any interleaving LMUs. Similarly, the array of memory units configured as LMUs also remain contiguous to each other in that the LMUs are still adjacent to each other without any interleaving SMUs. The order of the data segments stored in the array of SMUs and LMUs are also maintained relative to the locations of the other SMUs in a circular fashion.

As indicated by arrow 680, a third iteration of wear-leveling comprises relocating a first SMU (e.g., SMU 603) to a memory unit after a last SMU (e.g. SMU 602) and relocating a first LMU (e.g., LMU 608) to a memory unit after the last LMU (e.g., LMU 607). Such an embodiment of wear-leveling amounts to switching the location of the first SMU 603 with the location of the first LMU 608. Arrow 680 points to SMU 603 and LMU 608 in X3D memory 600 that will be relocated during the third iteration of wear-leveling. After the third iteration of wear-leveling, the locations of SMU 603, storing hot data segment 3, and LMU 608, storing warm/cold data segment 13, will be swapped in X3D memory 600. Therefore, the embodiments of wear-leveling disclosed herein that switch locations of SMU 603 and LMU 608 facilitate ensuring that the locations of SMU 603 and LMU 608 are accessed at a similar frequency throughout the lifetime of X3D memory 600. In an embodiment, location data (e.g., location data 174) associated with the SMUs and LMUs may be updated to reflect the third iteration of wear-leveling. For example, the new locations of SMU 603 and/or LMU 608 may be updated after the third iteration of wear-leveling is complete.

Figure 7A:
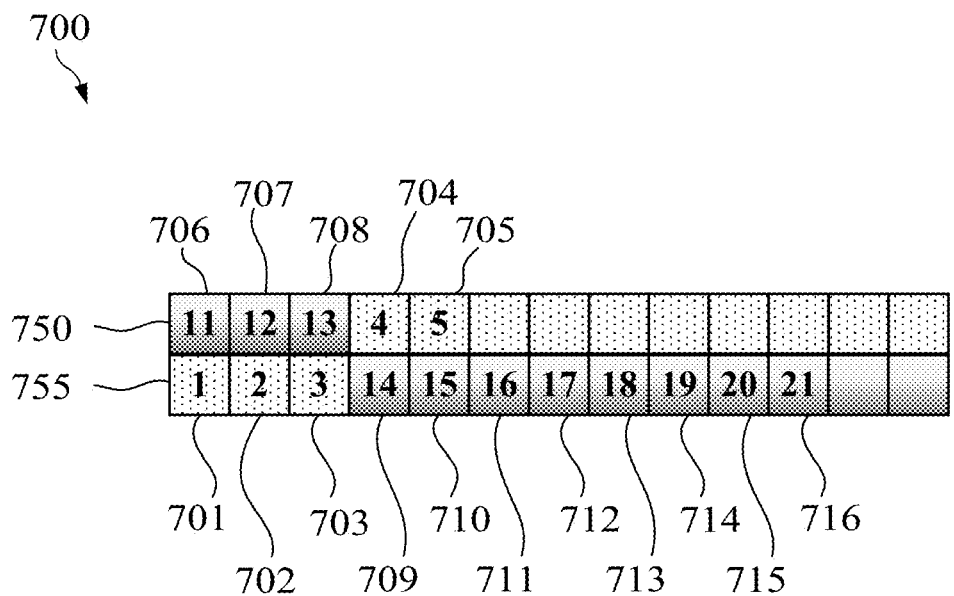
FIGS. 7A and 7B illustrate representations of the X3D memory after a third iteration wear-leveling has been performed on the X3D memory.
Figure 7B:
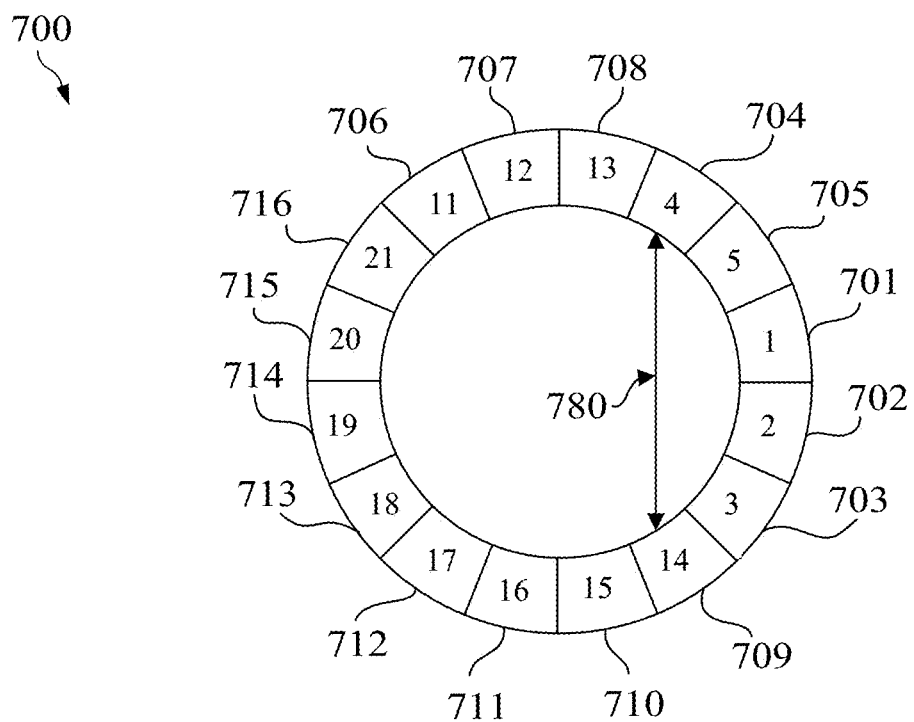

FIGS. 7A and 7B illustrate representations of an X3D memory 700 after a third iteration of wear-leveling has been performed on the X3D memory 400. FIG. 7A shows a grid representation of the X3D memory 700 after another iteration of wear-leveling has been performed on the X3D memory 600. The grid representation of X3D memory 700 is similar to the grid representation of X3D memory 600, except that in X3D memory 700, the memory unit that stores data segment 3 (e.g., SMU 703) and the memory unit that stores data segment 13 (e.g., SMU 708) have switched locations.

X3D memory 700 includes an array of memory units that each configured sequentially as SMUs 704, 705, 701, 702, and 703. SMUs 701 to 705 are similar to SMUs 601 to 605 and store similar data segments, respectively, except the absolute location of LMU 703 has changed. X3D memory 700 also includes an array of memory units that are each configured sequentially as LMUs 709, 710, 711, 712, 713, 714, 715, 716, 706, 707, and 708. LMUs 706 to 716 are similar to LMUs 406 to 416 and store similar data segments, respectively, except the absolute location of LMU 708 has changed. As shown in FIG. 7, row (or section) 750 may include any additional number of empty SMUs, and row 755 may include any additional number of empty LMUs.

After the next iteration of wear-leveling is performed on X3D memory 600 to result in X3D memory 700, the third memory unit in row 750 is now configured as LMU 708 storing data segment 13 (warm/cold data). Similarly, the third memory unit in row 755 is now configured as SMU 703 storing data segment 3 (hot data). In effect, the second iteration of wear-leveling swaps the locations of SMU 403 and LMU 408 (see FIG. 4) to result in the post wear-leveling locations of SMU 703 and SMU 708.

FIG. 7B shows a circular representation of the X3D memory 700 after a third iteration of wear-leveling has been performed on X3D memory 400 with an arrow 780 illustrating how a fourth iteration of wear-leveling will be performed on X3D memory 700. The circular representation of X3D memory 700 shown in FIG. 7B is structured similar to and stores similar data segments as the circular representation of X3D memory 700 shown in FIG. 7A, except that in X3D memory 700, the memory unit that stores data segment 3 (e.g., SMU 703) and the memory unit that stores data segment 13 (e.g., SMU 708) have switched locations.

As shown in FIG. 7B, SMUs 704-705 remain in their original memory unit locations and SMUs 701 and 702 remains moved from the beginning of the array of SMUs to the end of the array of SMUs. However, SMU 703 has moved from the beginning of the array of SMUs to the end of the array of SMUs. The order of the array of memory units configured as SMUs becomes SMU 704, SMU 705, SMU 701, SMU 702, and SMU 703. Similarly, LMUs 709 to 716 remain in their original memory unit locations (e.g., the SMUs 409-416), and LMUs 706 and 707 remains moved from the beginning of the array of LMUs to the end of the array of LMUs. However, LMU 708 has moved from the beginning of the array of LMUs to the end of the array of LMUs.

After the third iteration of wear-leveling has been performed to create X3D memory 700, the array of memory units configured as SMUs remain contiguous to each other in that the SMUs are still adjacent to each other without any interleaving LMUs. Similarly, the array of memory units configured as LMUs also remain contiguous to each other in that the LMUs are still adjacent to each other without any interleaving SMUs. The order of the data segments stored in the array of SMUs and LMUs are also maintained relative to the locations of the other SMUs in a circular fashion.

As indicated by arrow 780, a fourth iteration of wear-leveling comprises relocating a first SMU (e.g., SMU 704) to a memory unit after a last SMU (e.g. SMU 703) and relocating a first LMU (e.g., LMU 709) to a memory unit after the last LMU (e.g., LMU 708). Such an embodiment of wear-leveling amounts to switching the location of the first SMU 704 with the location of the first LMU 709. Arrow 780 points to SMU 704 and LMU 709 in X3D memory 700 that will be relocated during the fourth iteration of wear-leveling. After the fourth iteration of wear-leveling, the locations of SMU 704, storing hot data segment 4, and LMU 709, storing warm/cold data segment 14, will be swapped in X3D memory 700. Therefore, the embodiments of wear-leveling disclosed herein that switch locations of SMU 704 and LMU 709 facilitate ensuring that the locations of SMU 704 and LMU 709 are accessed at a similar frequency throughout the lifetime of X3D memory 700. In an embodiment, location data (e.g., location data 174) associated with the SMUs and LMUs may be updated to reflect the fourth iteration of wear-leveling. For example, the new locations of SMU 704 and/or LMU 709 may be updated after the fourth iteration of wear-leveling is complete.

Figure 8A:
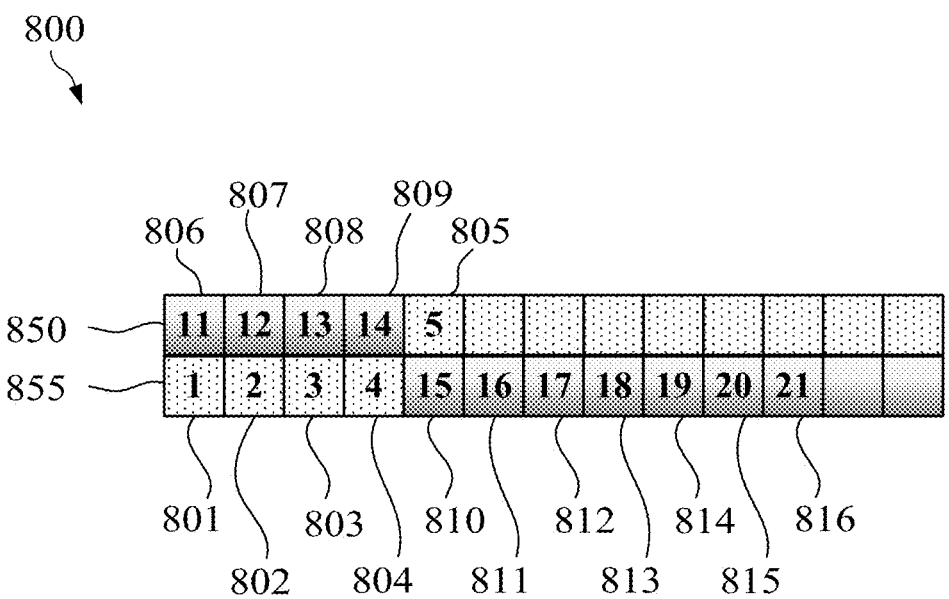
FIGS. 8A and 8B illustrate representations of the X3D memory after a fourth iteration wear-leveling has been performed on the X3D memory.
Figure 8B:
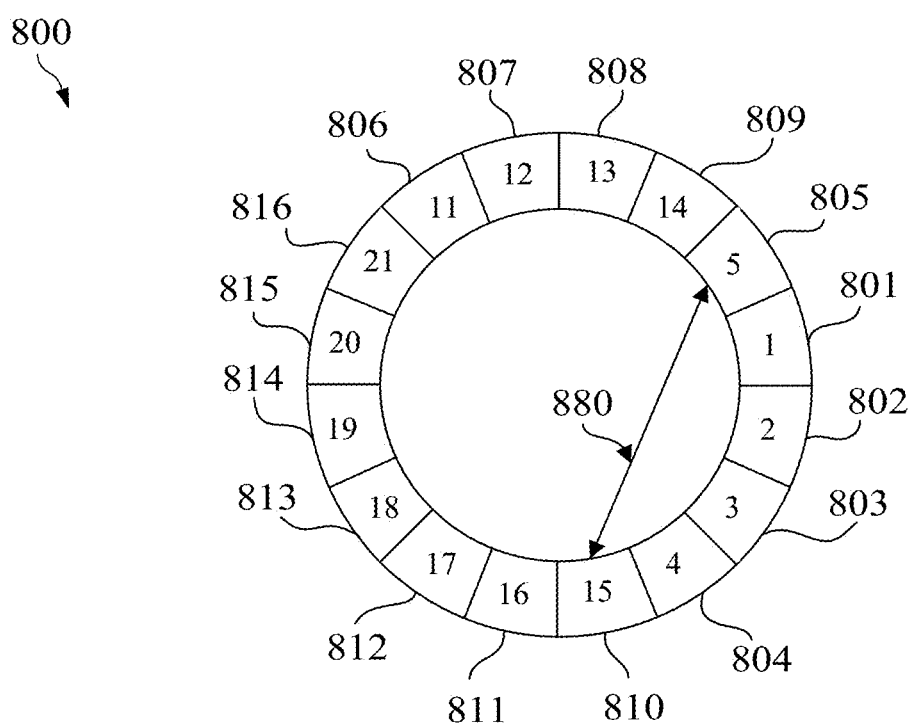

FIGS. 8A and 8B illustrate representations of an X3D memory 800 after a fourth iteration of wear-leveling has been performed on the X3D memory 400. FIG. 8A shows a grid representation of the X3D memory 800 after another iteration of wear-leveling has been performed on the X3D memory 700. The grid representation of X3D memory 800 is similar to the grid representation of X3D memory 700, except that in X3D memory 800, the memory unit that stores data segment 4 (e.g., SMU 804) and the memory unit that stores data segment 14 (e.g., SMU 809) have switched locations.

X3D memory 800 includes an array of memory units that are each configured sequentially as SMUs 805, 801, 802, 803, and 804. SMUs 801 to 805 are similar to SMUs 701 to 705 and store similar data segments, respectively, except the absolute location of SMU 804 has changed. X3D memory 800 also includes an array of memory units that are each configured sequentially as LMUs 810, 811, 812, 813, 814, 815, 816, 806, 807, 808, and 809. LMUs 806 to 816 are similar to LMUs 406 to 416 and store similar data segments, respectively, except the absolute location of LMU 809 has changed. As shown in FIG. 8, row (or section) 850 may include any additional number of empty SMUs, and row 855 may include any additional number of empty LMUs.

After the next iteration of wear-leveling is performed on X3D memory 700 to result in X3D memory 800, the fourth memory unit in row 850 is now configured as LMU 809 storing data segment 14 (warm/cold data). Similarly, the fourth memory unit in row 855 is now configured as SMU 804 storing data segment 4 (hot data). In effect, the second iteration of wear-leveling swaps the locations of SMU 404 and LMU 409 (see FIG. 4) to result in the post wear-leveling locations of SMU 804 and SMU 806.

FIG. 8B shows a circular representation of the X3D memory 800 after a fourth iteration of wear-leveling has been performed on X3D memory 400. The grid representation of X3D memory 800 shown in FIG. 8B is structured similar to and stores similar data segments as the circular representation of X3D memory 800 shown in FIG. 8A, except that in X3D memory 800, the memory unit that stores data segment 4 (e.g., SMU 804) and the memory unit that stores data segment 14 (e.g., SMU 809) have switched locations.

As shown in FIG. 8B, SMU 805 remains in the original memory unit locations, and SMUs 801 to 803 remain moved from the beginning of the array of SMUs to the end of the array of SMUs. However, SMU 804 is moved from the beginning of the array of SMUs to the end of the array of SMUs. The order of the array of memory units configured as SMUs becomes SMU 805, SMU 801, SMU 802, SMU 803, and SMU 804. Similarly, LMUs 810 to 816 remain in their original memory unit locations, and LMUs 806 to 808 remain moved from the beginning of the array of LMUs to the end of the array of LMUs. However, SMU 809 is moved from the beginning of the array of LMUs to the end of the array of LMUs.

After the fourth iteration of wear-leveling has been performed to create X3D memory 800, the array of memory units configured as SMUs remain contiguous to each other in that the SMUs are still adjacent to each other without any interleaving LMUs. Similarly, the array of memory units configured as LMUs also remain contiguous to each other in that the LMUs are still adjacent to each other without any interleaving SMUs. The order of the data segments stored in the array of SMUs and LMUs are also maintained relative to the locations of the other SMUs in a circular fashion.

As indicated by arrow 880, a fifth iteration of wear-leveling comprises relocating a first SMU (e.g., SMU 805) to a memory unit after a last SMU (e.g. SMU 804) and relocating a first LMU (e.g., LMU 810) to a memory unit after the last LMU (e.g., LMU 809). Such an embodiment of wear-leveling amounts to switching the location of the first SMU 805 with the location of the first LMU 810. Arrow 880 points to SMU 805 and LMU 810 in X3D memory 800 that will be relocated during the fifth iteration of wear-leveling. After the fifth iteration of wear-leveling, the locations of SMU 805, storing hot data segment 5, and LMU 810, storing warm/cold data segment 15, will be swapped in X3D memory 800. Therefore, the embodiments of wear-leveling disclosed herein that switch locations of SMU 805 and LMU 810 facilitate ensuring that the locations of SMU 805 and LMU 810 are accessed at a similar frequency throughout the lifetime of X3D memory 800. In an embodiment, location data (e.g., location data 174) associated with the SMUs and LMUs may be updated to reflect the fifth iteration of wear-leveling. For example, the new locations of SMU 805 and/or LMU 806 may be updated after the fifth iteration of wear-leveling is complete.

Figure 9A:
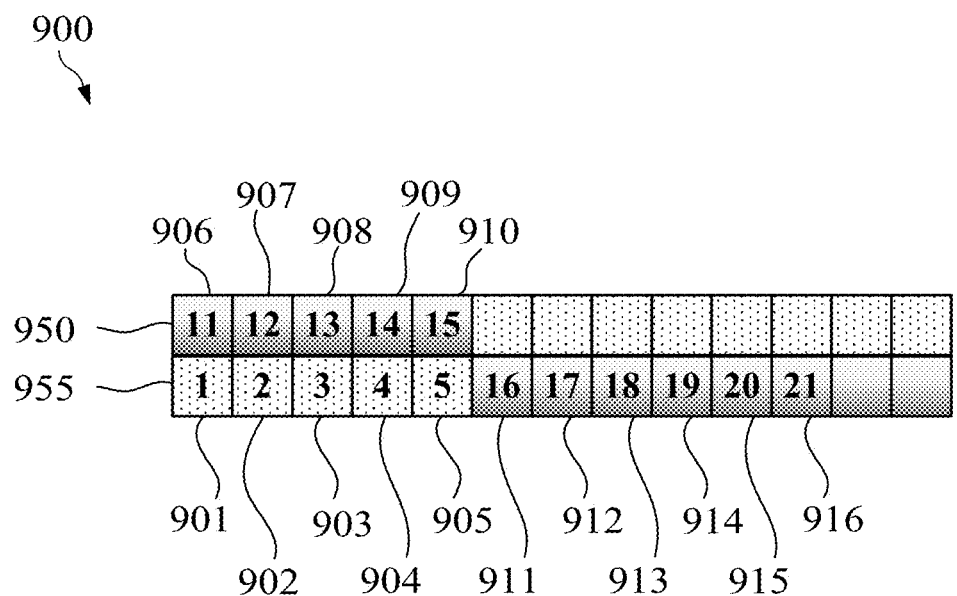
FIGS. 9A and 9B illustrate representations of the X3D memory after a fifth iteration wear-leveling has been performed on the X3D memory.
Figure 9B:
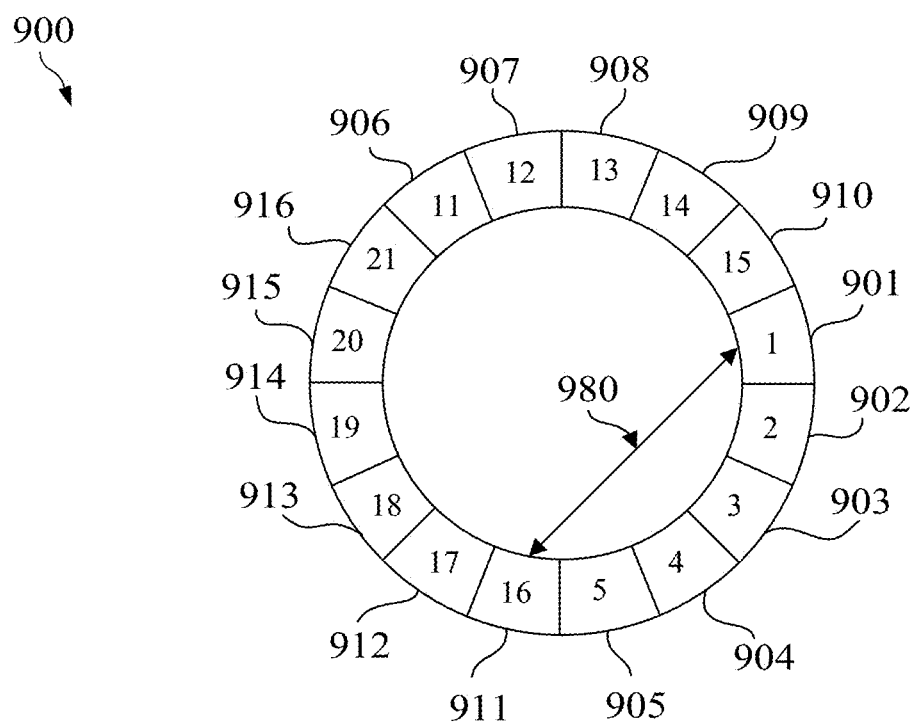

FIGS. 9A and 9B illustrate representations of an X3D memory 900 after a fifth iteration of wear-leveling has been performed on the X3D memory 400. FIG. 9A shows a grid representation of the X3D memory 900 after another iteration of wear-leveling has been performed on the X3D memory 800. The grid representation of X3D memory 900 is similar to the grid representation of X3D memory 800, except that in X3D memory 900, the memory unit that stores data segment 5 (e.g., SMU 905) and the memory unit that stores data segment 15 (e.g., SMU 910) have switched locations. As shown, the SMUs 901 to 905 have cycled through one revolution (five iterations, which is equal to the number of SMUs storing data segments 1 to 5), and the array of memory units configured as SMUs is once again 901, 902, 903, 904, and 905. The SMUs 901 to 905 are at absolute locations that store data segments in the order of 1, 2, 3, 4, and 5.

X3D memory 900 includes an array of memory units that are each configured sequentially as SMUs 901, 902, 903,

904, and 905. SMUs 901 to 905 are similar to SMUs 401 to 405 and store similar data segments, respectively, except that the absolute location of SMU 905 has changed. X3D memory 900 also includes an array of memory units that are each configured sequentially as LMUs 911, 912, 913, 914, 915, 916, 906, 907, 908, 909, and 910. LMUs 910 to 916 are similar to LMUs 406 to 416 and store similar data segments, respectively, except the absolute location of LMU 910 has changed. As shown in FIG. 9, row (or section) 950 may include any additional number of empty SMUs, and row 955 may include any additional number of empty LMUs.

After the next iteration of wear-leveling is performed on X3D memory 800 to result in X3D memory 900, the fifth memory unit in row 950 is now configured as LMU 910 storing data segment 15 (warm/cold data). Similarly, the fifth memory unit in row 955 is now configured as SMU 905 storing data segment 5 (hot data). In effect, the second iteration of wear-leveling swaps the locations of SMU 405 and LMU 405 (see FIG. 4) to result in the post wear-leveling locations of SMU 905 and SMU 910.

FIG. 9B shows a circular representation of the X3D memory 900 after a fifth iteration of wear-leveling has been performed on X3D memory 400 with an arrow 980 illustrating how a sixth iteration of wear-leveling will be performed on X3D memory 900. The circular representation of X3D memory 900 shown in FIG. 9B is structured similar to and stores similar data segments as the circular representation of X3D memory 900 shown in FIG. 9A, except that in X3D memory 900, the memory unit that stores data segment 5 (e.g., SMU 905) and the memory unit that stores data segment 15 (e.g., SMU 910) have switched locations.

As shown in FIG. 9B, SMUs 901 to 905 have been wear-leveled in one revolution (five iterations) such that the array of memory units configured as SMUs 901 to 905 is once again in the order of SMU 901, 902, 903, 904, and 905. Since there are a greater number of LMUs than SMUs, the array of memory units configured as LMUs is not yet in the original order. As shown in FIG. 9, LMUs 911 to 916 remain in their original memory unit locations, while LMUs 906 to 909 remain moved from the beginning of the array of LMUs to the end of the array of LMUs. However, SMU 910 is moved from the beginning of the array of LMUs to the end of the array of LMUs.

After the fifth iteration of wear-leveling has been performed to create X3D memory 900, the array of memory units configured as SMUs remain contiguous to each other in that the SMUs are still adjacent to each other without any interleaving LMUs. Similarly, the array of memory units configured as LMUs also remain contiguous to each other in that the LMUs are still adjacent to each other without any interleaving SMUs. The order of the data segments stored in the array of SMUs and LMUs are also maintained relative to the locations of the other SMUs in a circular fashion.

X3D memory 900 may restart the rotation of SMUs 901 to 905 in a sixth iteration of wear-leveling performed on X3D memory 900. As indicated by arrow 980, a sixth iteration of wear-leveling comprises relocating a first SMU (e.g., SMU 901) to a memory unit after a last SMU (e.g. SMU 905) and relocating a first LMU (e.g., LMU 911) to a memory unit after the last LMU (e.g., LMU 910). Such an embodiment of wear-leveling amounts to switching the location of the first SMU 901 with the location of the first LMU 911. Arrow 980 points to SMU 901 and LMU 911 in X3D memory 900 that will be relocated during the sixth iteration of wear-leveling. After the sixth iteration of wear-leveling, the locations of SMU 901, storing hot data segment 1, and LMU 911, storing warm/cold data segment 16 will be swapped in X3D memory 900. Therefore, the embodiments of wear-leveling disclosed herein that switch locations of SMU 901 and LMU 911 facilitate ensuring that the locations of SMU 901 and LMU 911 are accessed at a similar frequency throughout the lifetime of X3D memory 900.

Figure 10A:
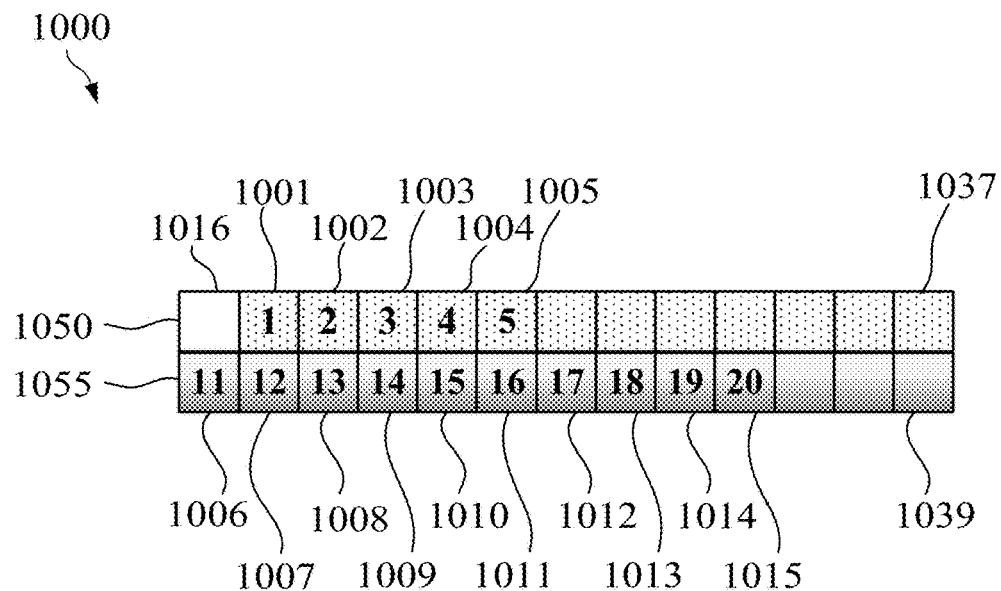
FIGS. 10A and 10B illustrate representations of an initial state of X3D memory with an empty memory unit before wear-leveling has been performed on the X3D memory.
Figure 10B:
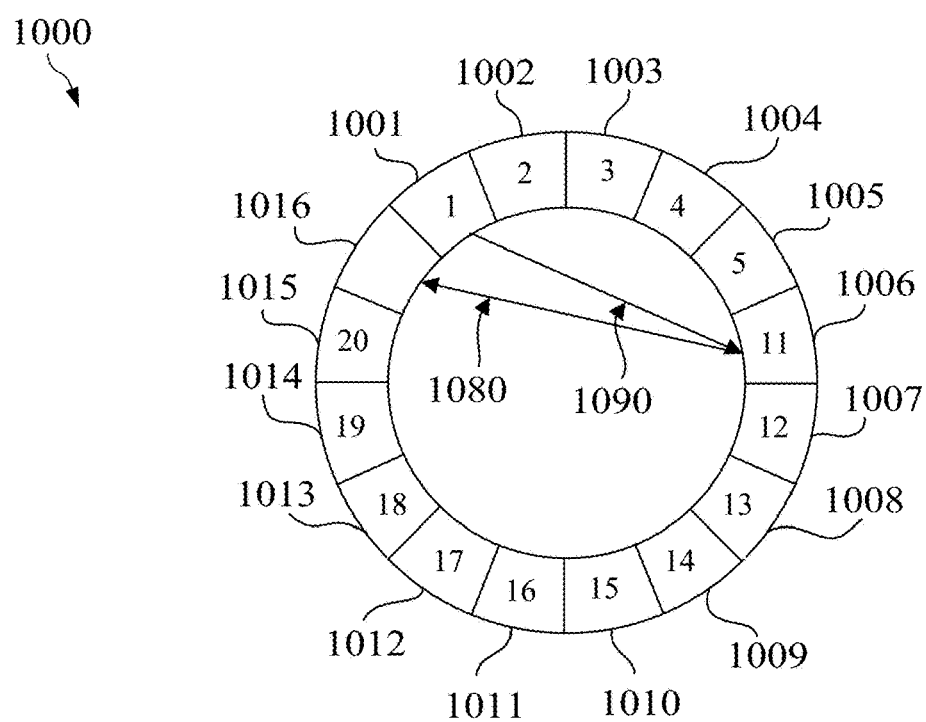

FIGS. 10A and 10B illustrate representations of an initial state of X3D memory 1000 with an empty memory unit 1016 before wear-leveling has been performed on the X3D memory 1000. FIG. 10A shows a grid representation of an X3D memory 1000. The grid representation of X3D memory 1000 is similar to the grid representation of X3D memory 400 in FIG. 4A. However, a first memory unit in row (or section) 1050 is an empty memory unit 1016. The empty memory unit 1016 may not be configured as either an SMU or an LMU. In an embodiment, the empty memory unit 1016 is configured as either an SMU or an LMU, but still does not store data. Although only one empty memory unit 1016 is shown in FIGS. 10A-B, there may be multiple empty memory units 1016 in the X3D memory 1000.

Similar to X3D memory 400, X3D memory 1000 includes an array of memory units that are each configured sequentially as SMUs 1001 to 1005. In an embodiment, SMUs 1001 to 1005 are each similar to SMU 210. In row 1050, the second memory unit through the sixth memory unit are each SMUs 1001 to 1005, respectively. As shown in FIG. 10A, SMUs 1001 to 1005 each respectively stores data segments 1 to 5 of a file, similar to SMUs 401 to 405. For example, data segments 1 to 5 represent sequential data segments of an ordered FTL table (hot data). Row 1050 also includes empty SMUs, such as SMU 1037, that do not store data.

Similar to X3D memory 400, X3D memory 1000 also includes an array of memory units that are each configured sequentially as LMUs 1006 to 1015. In an embodiment, LMUs 1006 to 1015 are each similar to LMU 215. In row 1055, the first memory unit through the tenth memory unit are each LMUs 1006 to 1015, respectively. LMUs 1006 to 1015 each respectively stores data segments 11 to 20 of a file, similar to LMUs 406 to 415. For example, data segments 11-20 represent sequential data segments of a movie file (warm/cold data). Row 1055 also includes empty LMUs, such as LMU 1039, that do not store data. In an embodiment, the wear-leveling performed on X3D memory 1000 is similar to the wear-leveling performed on X3D memory 400. However, instead of the first SMU (e.g, SMU 1001) being swapped with the first LMU (e.g., LMU 1006), the wear-leveling performed to result in X3D memory 1100 comprises relocating the first LMU (e.g., LMU 1006) to the location of the empty memory unit 1016, relocating the first SMU (e.g., SMU 1001) to the memory unit after the last SMU (e.g., SMU 1037), and erasing the original location of the first SMU (e.g., SMU 1001) so that the original location of the first SMU becomes the empty memory unit 1016.

FIG. 10B shows a circular representation of X3D memory 1000 with arrows 1080 and 1090 illustrating how a first iteration of wear-leveling will be performed on X3D memory 1000. The circular representation of X3D memory 1000 shown in FIG. 10B is structured similar to and stores similar data segments as the grid representation of X3D memory 1000 shown in FIG. 10A. As shown in FIG. 10B, X3D memory 1000 comprises an empty memory unit 1016 that is disposed between the end of the array of memory units configured as LMUs 1006 to 1015 (e.g., after LMU 1015) and the beginning of the array of memory units configured as SMUs 1001 to 1005 (e.g., before SMU 1005).

In an embodiment, the wear-leveling performed on X3D memory 1000 is similar to the wear-leveling performed on X3D memory 400. However, instead of the first SMU (e.g, SMU 1001) being swapped with the first LMU (e.g., LMU 1006), the wear-leveling performed to result in X3D memory 1100 comprises relocating the first LMU (e.g., LMU 1006) to the location of the empty memory unit 1016, relocating the first SMU (e.g., SMU 1001) to the memory unit after the last SMU (e.g., SMU 1005), and erasing the original location of the first SMU (e.g., SMU 1001) so that the original location of the first SMU becomes the empty memory unit 1016. X3D memory 1000 shown in FIG. 10B does not include any empty SMUs or empty LMUs (although X3D memory 1000 shown in FIG. 10A does). However, the last contiguous SMU is considered the last SMU, regardless of whether the SMU stores data or not. Similarly, the last contiguous LMU is considered the last LMU, regardless of whether the LMU stores data or not.

For example, relocating the first LMU 1006 to the location of the empty memory unit 1016 comprises writing data segment 11 to the empty memory unit. Relocating the first SMU 1001 to the memory unit after the last SMU comprises writing data segment 1 to LMU 1006. Data segment 1 may be erased from the previous location of the first SMU 1001 so that the previous location of the first SMU 1001 becomes the empty memory unit 1016.

A first iteration of wear-leveling is shown by arrows 1080 and 1090. Arrow 1080 shows LMU 1006, storing data segment 11, being relocated to the empty memory unit 1016 in the first iteration of wear-leveling. Arrow 1090 shows the SMU 1001, storing data segment 1, being relocated to the memory unit after the last SMU (e.g., SMU 1005), where LMU 1006 is currently located. This wear-leveling process has the same effect of switching locations of hot data and cold data as the wear-leveling process disclosed in FIGS. 4-9, but additionally switches locations of the empty memory unit 1016. The empty memory unit 1016 is involved in the wear-leveling process as data is written to and from the empty memory unit 1016 to the location of another SMU or LMU during each iteration of wear-leveling. This helps ensure that the locations of the empty memory unit 1016, SMU 1001, and LMU 1006 are accessed at a substantially equal frequency throughout the lifetime of X3D memory 1000. In an embodiment, location data (e.g., location data 174) associated with the SMUs and LMUs may be updated to reflect the first iteration of wear-leveling.

Figure 11A:
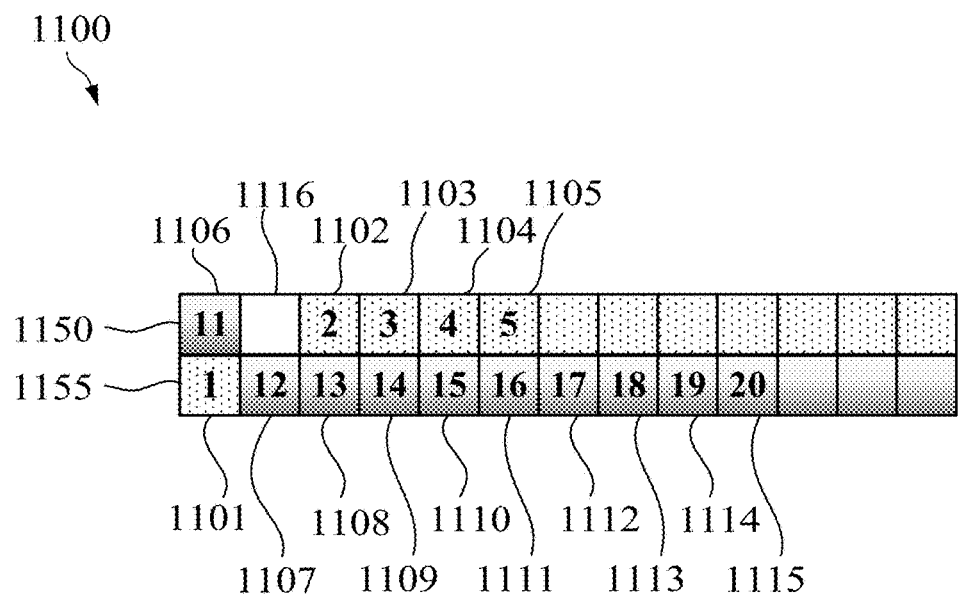
FIGS. 11A and 11B illustrate representations of an initial state of X3D memory with an empty memory unit after a first wear-leveling has been performed on the X3D memory.
Figure 11B:
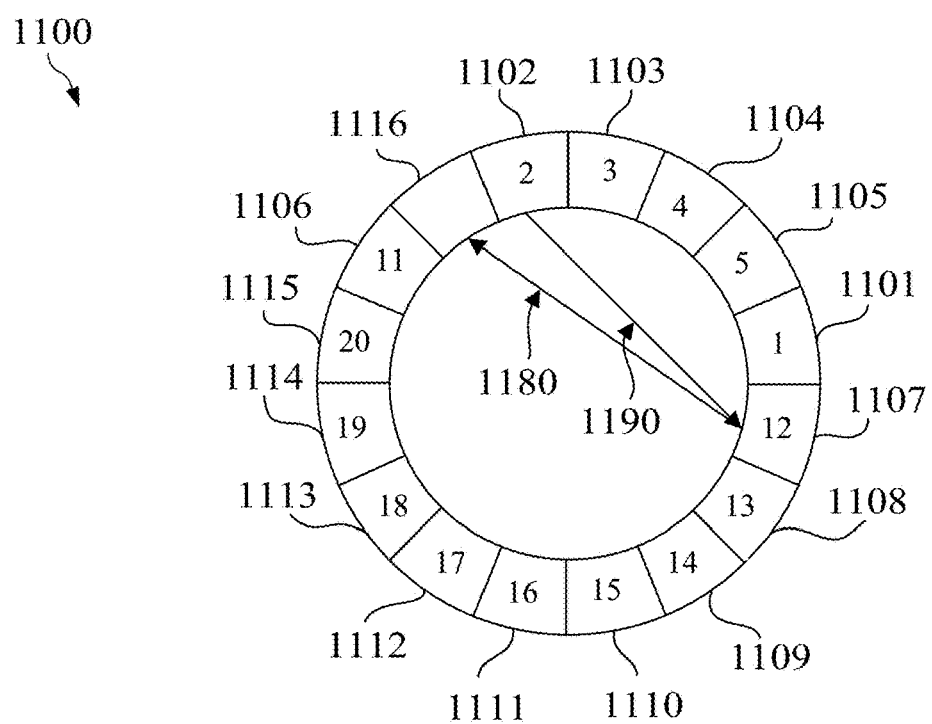

FIGS. 11A and 11B illustrate representations of an X3D memory 1100 after a first iteration of wear-leveling has been performed on the X3D memory 1000. FIG. 11A shows a grid representation of the X3D memory 1100. The grid representation of X3D memory 1100 is similar to the grid representation of X3D memory 1000, except that the first LMU (e.g., LMU 1106) is relocated to the memory unit after the last LMU (e.g., LMU 1115). The memory unit after LMU 1115 is the empty memory unit (e.g., empty memory unit 1116). The first SMU (e.g., SMU 1101) is relocated to the memory unit after the last SMU (e.g., SMU 1105), which is the original location of LMU 1116. The empty memory unit 1116 has been relocated to the original location of the first SMU.

X3D memory 1100 includes an array of memory units that each configured sequentially as SMUs 1102, 1103, 1104, 1105, and 1101. SMUs 1101 to 1105 are similar to SMUs 1000 to 1005 and store similar data segments, respectively, except that the absolute location of SMU 1101 has changed. X3D memory 1100 also includes an array of memory units that are each configured sequentially as LMUs 1107, 1108, 1109, 1110, 1111, 1112, 1113, 1114, 1115, and 1106. LMUs 1106 to 1115 are similar to LMUs 1000 to 1015 and store similar data segments, respectively, except that the absolute location of LMU 1106 has changed.

After the first iteration of wear-leveling, as shown in FIG. 11A, the first memory unit in row (or section) 1150 is LMU 1106 storing data segment 11 (warm/cold data), and the first memory unit in row 1155 is SMU 1001 storing data segment 1 (hot data). The empty memory unit 1116 is then relocated to the original location of the first SMU.

FIG. 11B shows a circular representation of X3D memory 1100 with arrows 1180 and 1190 illustrating how a second iteration of wear-leveling will be performed on X3D memory 1100. The circular representation of X3D memory 1100 shown in FIG. 11B is structured similar to and stores similar data segments as the grid representation of X3D memory 1100 shown in FIG. 11A. As shown in FIG. 11B, X3D memory 1100 comprises an empty memory unit 1116 that is disposed between the end of the array of memory units configured as LMUs 1106 to 1115 (e.g., after LMU 1106) and the beginning of the array of memory units configured as SMUs 1101 to 1105 (e.g., before SMU 1102).

A second iteration of wear-leveling is shown by arrows 1180 and 1190. In an embodiment, the second iteration wear-leveling performed on X3D memory 1100 is similar to the first iteration of wear-leveling performed on X3D memory 1000. Arrow 1180 shows LMU 1107, storing data segment 12, being relocated to the empty memory unit 1116. Arrow 1190 shows the SMU 1102, storing data segment 2, being relocated to the memory unit after the last SMU (e.g., SMU 1101). The memory unit after the last SMU is where LMU 1107 is currently located. In an embodiment, location data (e.g., location data 174) associated with the SMUs and LMUs may be updated to reflect the second iteration of wear-leveling.

Figure 12A:
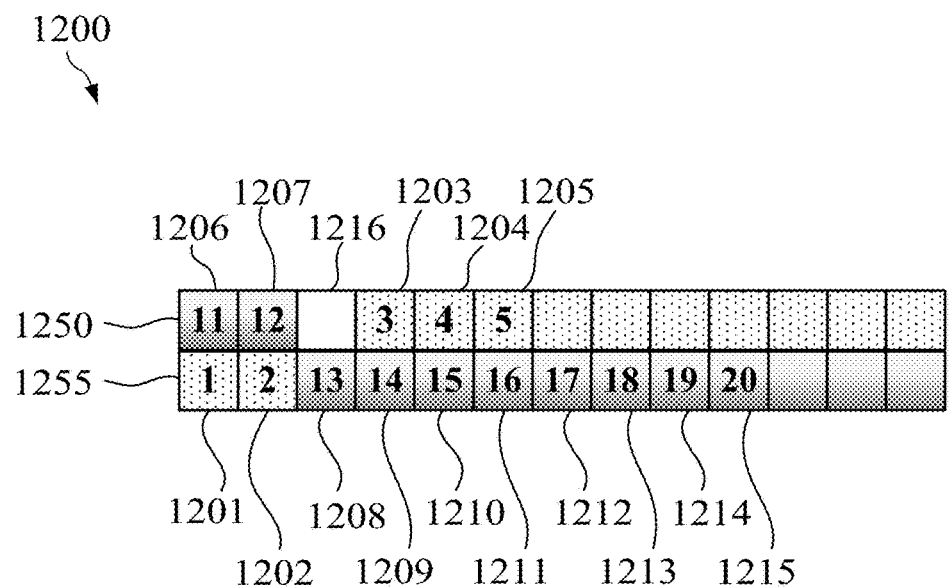
FIGS. 12A and 12B illustrate representations of an initial state of X3D memory with an empty memory unit after a second wear-leveling has been performed on the X3D memory.
Figure 12B:
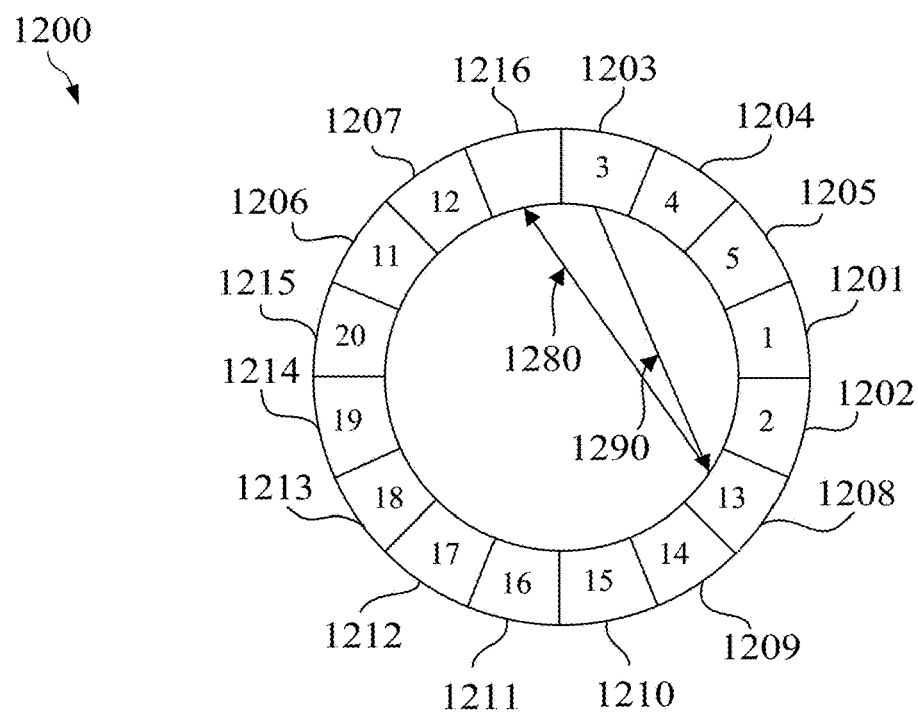

FIGS. 12A and 12B illustrate representations of an X3D memory 1200 after a second iteration of wear-leveling has been performed on the X3D memory 1000. FIG. 12A shows a grid representation of the X3D memory 1200. The grid representation of X3D memory 1200 is similar to the grid representation of X3D memory 1100, except that the first LMU (e.g., LMU 1207) is relocated to the memory unit after the last LMU (e.g., LMU 1206). The memory unit after the last LMU is the empty memory unit (e.g., empty memory unit 1216). The first SMU (e.g., SMU 1202) is relocated to the memory unit after the last SMU (e.g., SMU 1201), which is the original location of LMU 1116. The empty memory unit 1216 is then relocated to the original location of the first SMU.

X3D memory 1200 includes an array of memory units that each configured sequentially as SMUs 1203, 1204, 1205, 1201, and 1202. SMUs 1201 to 1205 are similar to SMUs 1000 to 1005 and store similar data segments, respectively, except that the absolute location of SMU 1202 has changed. X3D memory 1200 also includes an array of memory units that are each configured sequentially as LMUs 1208, 1209, 1210, 1211, 1212, 1213, 1214, 1215, 1206, and 1207. LMUs 1206 to 1215 are similar to LMUs 1000 to 1015 and store similar data segments, except that the absolute location of LMU 1207 has changed.

After the second iteration of wear-leveling, as shown in FIG. 12A, the second memory unit in row (or section) 1250 is LMU 1207 storing data segment 12 (warm/cold data), and the second memory unit in row 1255 is SMU 1202 storing data segment 2 (hot data). The empty memory unit 1216 is then relocated to the original location of the first SMU.

FIG. 12B shows a circular representation of X3D memory 1200 with arrows 1280 and 1290 illustrating how a third iteration of wear-leveling will be performed on X3D memory 1200. The circular representation of X3D memory 1200 shown in FIG. 12B is structured similar to and stores similar data segments as the grid representation of X3D memory 1200 shown in FIG. 12A, except that the X3D memory 1200 is shown in a circular fashion. As shown in FIG. 12B, X3D memory 1200 comprises an empty memory unit 1216 that is disposed between the end of the array of memory units configured as LMUs 1206 to 1215 (e.g., after LMU 1207) and the beginning of the array of memory units configured as SMUs 1201 to 1205 (e.g., before SMU 1203).

A third iteration of wear-leveling is shown by arrows 1280 and 1290. In an embodiment, the wear-leveling performed on X3D memory 1200 is similar to the wear-leveling performed on X3D memory 1100. Arrow 1280 shows LMU 1208, storing data segment 13, being relocated to the empty memory unit 1216 in the second iteration of wear-leveling. Arrow 1290 shows the SMU 1203, storing data segment 3, being relocated to the memory unit after the last SMU (e.g., SMU 1202), where LMU 1208 is currently located. In an embodiment, location data (e.g., location data 174) associated with the SMUs and LMUs may be updated to reflect the third iteration of wear-leveling.

Although only three iterations of wear-leveling have been shown in FIGS. 10-12, it should be appreciated that any number of iterations of wear-leveling can be performed on X3D memory 1000. The data segments stored at the SMUs and LMUs of X3D memory 1000 may continue to be cycled through and swapped with data stored at other the SMUs and LMUs so long as the SMUs and LMUs maintain their contiguous nature throughout the iterations of wear-leveling.

The X3D memories shown in FIGS. 4-12 only comprise SMUs, LMUs, and empty memory units. However, an X3D memory may also comprise a MMU configured to store warm data, and any other type of memory unit configured to store any other type of data. In an embodiment, an X3D memory may comprise a plurality of sections (or zones) of different types of memory units. Each section may be configured to store a certain temperature of data. For example, a first section comprises SMUs configured to store hot data, a second section comprises MMUs configured to store warm data, a third section comprises LMUs configured to store cold data, and/or a fourth section comprises empty memory units that are not specifically configured to store any type of data. The memory units in each of the sections are contiguous with each other. In an embodiment, multiple sections may be configured to store the same type of data.

Figure 13A:
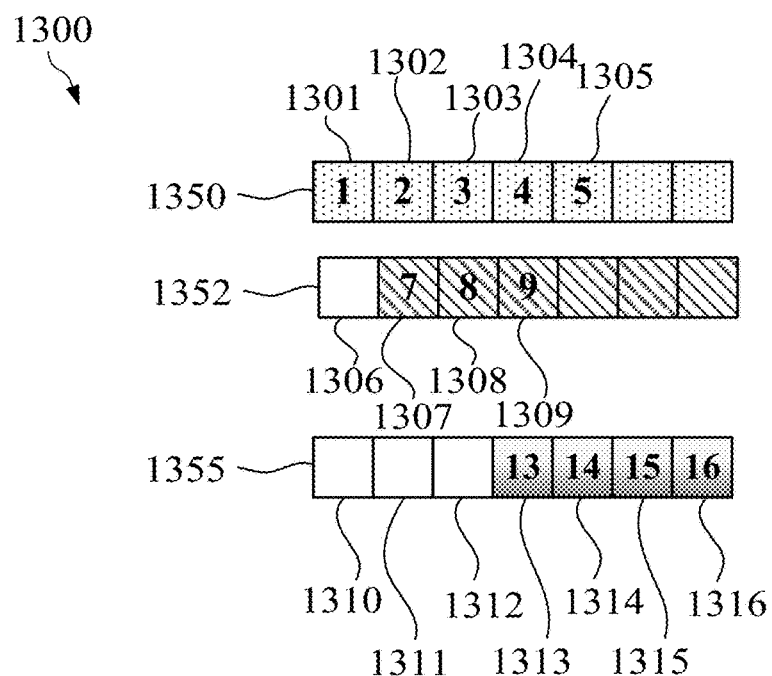
FIGS. 13A and 13B illustrate representations of X3D memory have multiple sections for storing various types of data.
Figure 13B:
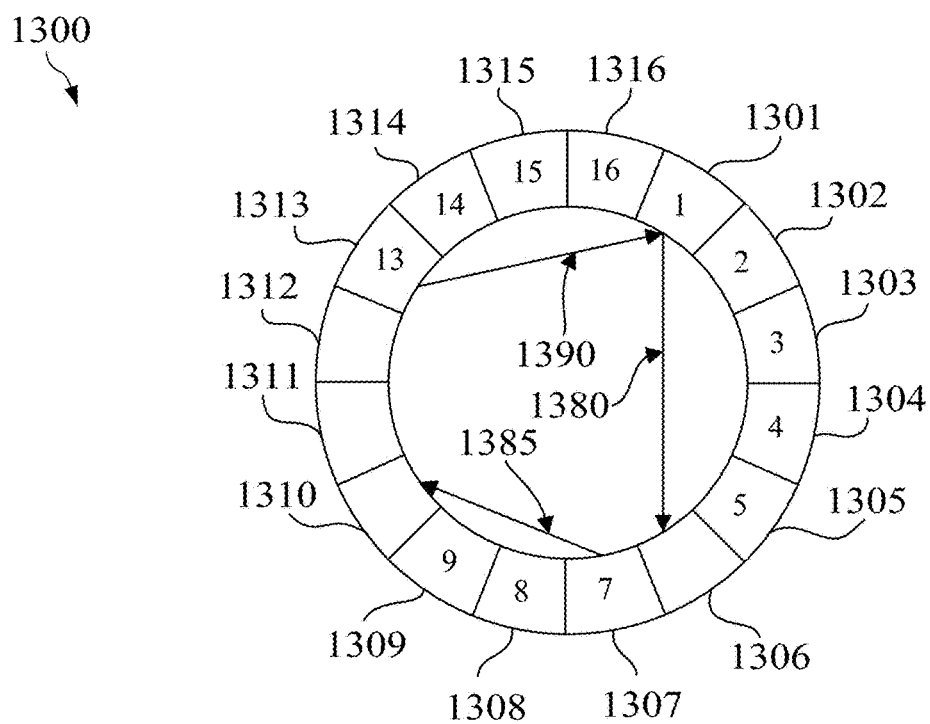

FIGS. 13A and 13B illustrate representations of X3D memory 1300 have multiple sections for storing various types of data. FIG. 13A shows a grid representation of X3D memory 1300. X3D memory 1300 includes row (or section) 1350, row 1352, and row 1355. Row 1350 includes an array of memory units that are each configured sequentially as SMUs 1301 to 1305, which respectively stores data segments 1 to 5. Row 1352 includes an empty memory unit 1306, and any array of memory units that are each configured sequentially as MMUs 1307 to 1309, which respectively stores data segments 7 to 9. Row 1355 includes an array of empty memory units 1310 to 1312, and an array of memory units that are each configured sequentially as LMUs 1313 to 1316, which respectively stores data segments 13 to 16. Empty memory units 1306 and 1310 to 1312 are not configured as either SMUs, MMUs, or LMUs, and do not store any data. As shown in FIG. 13, the SMUs are contiguous with each other, the MMUs are contiguous with each other, and the LMUs are contiguous with each other.

FIG. 13B shows a circular representation of X3D memory 1300 with arrows 1380, 1385, and 1390 illustrating how an iteration of wear-leveling will be performed on X3D memory 1300. The circular representation of X3D memory 1300 illustrates how the data structures stored in X3D memory 1300 are logically organized by the section (or row) and into a circle such that wear-leveling may be performed within each section and between each section. In an embodiment, the wear-leveling performed on X3D memory 1300 is similar to the wear-leveling performed on X3D memory 400 and 1000.

Arrow 1380 shows SMU 1301, storing data segment 1, being relocated to the empty memory unit 1306 during an iteration of wear-leveling. Arrow 1385 shows MMU 1307, storing data segment 7, being relocated to the empty memory unit 1310 during an iteration of wear-leveling. Arrow 1390 shows LMU 1313, storing data segment 13, being relocated to the position where SMU 1301 used to be located prior to relocating to the empty memory unit 1306. In an embodiment, SMU 1301 is relocated first, MMU 1307 is relocated second, and LMU 1313 is relocated third, to make efficient use of the empty memory units available without having to use a buffer to temporarily store the data. Therefore, the circular representation of X3D memory 1300 shows the embodiments of wear-leveling disclosed herein help maintain the data structure for the data stored in each of the sections and maintain the relative order of the data in each of the sections.

In an embodiment, when a user of an HMD (e.g., HMD 100) searches for data to perform a read and/or write request on the data, a processor (e.g., processor 130) determines whether the data is stored on the X3D memory (e.g., X3D memory 133) or the secondary memory (e.g., secondary memory 140). In an embodiment, the X3D memory stores hotter data than the secondary memory. For example, the processor searches the location data (e.g., location data 174) to determine whether the data is stored in the X3D memory. The processor may then identify the location of the data in the SMUs or the LMUs if the processor determines that the data is stored in the X3D memory. Otherwise, the processor searches the secondary memory for the requested data. When the data that is searched for is stored in the X3D memory, the data can be written directly to the location of the data as X3D memory supports the in-place updating of data. The embodiments of wear-leveling disclosed herein help lengthen the lifespan of an X3D memory by ensuring that all of the memory cells of the X3D memory are read, written to, written from, and programmed at approximately the same rate. This way, all of the memory cells of the X3D memory will wear out at the same rate, instead of the memory cells storing hot data wearing out much faster than the memory cells storing cold data. When all of the memory cells of the X3D memory wear out at the same rate, the lifespan of the X3D memory is significantly increased.

Embodiments of the present disclosure also ensure that the order of the data structures stored at the X3D memory are maintained relative to each other after each iteration of wear-leveling. Because the X3D memory is non-volatile, the hot data stored at SMUs will be stored as long as needed and is not dependent on the SMUs being powered.

In an embodiment, the disclosure includes a method for wear-leveling in an X3D memory, comprising a means for detecting a trigger event, wherein the X3D memory comprises a first section of memory units and a second section of memory units, the first section of memory units comprises a plurality of contiguous memory units configured to store data of a first type, and the second section of memory units comprises a plurality of memory units configured store data of a second type, and in response to detecting the trigger event, a means for relocating data stored in a first memory unit of the first section of memory units to a memory unit adjacent to a last memory unit of the first section of memory units, and a means for relocating data stored in a first memory unit of the second section of memory units to a memory unit adjacent to a last memory unit of the second section of memory units.

In an embodiment, the disclosure includes an X3D memory, comprising a plurality of SMUs stored in contiguous locations in the X3D memory and configured to store data of a first type, and a plurality of LMUs stored in contiguous locations in the X3D memory and configured to store data of a second type, wherein wear-leveling of the X3D memory comprises a means for detecting a trigger event, in response to the trigger event, a means for relocating data stored in a first SMU of the plurality of SMUs to a memory unit adjacent to a last SMU of the plurality of SMUs, wherein the plurality of SMUs are stored in contiguous locations in the X3D memory, and a means for relocating data stored in a first LMU of the plurality of LMUs to a memory unit adjacent to a last LMU of the plurality of LMUs, wherein the plurality of LMUs are stored in contiguous locations in the X3D memory.

In an embodiment, the disclosure includes an HMD, comprising an X3D memory comprising a first plurality of MUs and a second plurality of MUs, a means for detecting a trigger event that triggers an iteration of wear-leveling to be performed on the X3D memory, wherein data stored in a first MU of the first plurality of MUs is relocated to a MU adjacent to a last MU of the first plurality of MUs, wherein the first plurality of MUs are stored in contiguous locations in the X3D memory, wherein data stored in a first MU of the second plurality of MUs is relocated to a MU adjacent to a last MU of the second plurality of MUs, and wherein the second plurality of MUs are stored in contiguous locations in the X3D memory.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method performed by a processor to improve wear-leveling in a cross-point memory, comprising:
    detecting, by a processor coupled to the cross-point memory, a first trigger event,
        the cross-point memory comprising a first section of memory units, a second section of memory units, and an empty memory unit positioned between the first section of memory units and the second section of memory units to create logical contiguity of data stored in the first section of memory units, the second section of memory units, and the empty memory unit,
    the first section of memory units comprising a plurality of logically contiguous memory units configured to store data of a first type, the data of the first type being hot data that is frequently accessed, the hot data stored at each memory unit of the first section of memory units comprising a portion of a flash translation layer (FTL) table; and
    the second section of memory units comprising a plurality of logically contiguous memory units configured to store data of a second type, the data of the second type being warm data or cold data, the warm data or the cold data comprising data that is less frequently accessed than the portion of the FTL that is the hot data; and in response to detecting the first trigger event:
    relocating, by the processor, data of the second type stored in a first memory unit of the second section of memory units to the empty memory unit;
    relocating, by the processor, data of the first type stored in a first memory unit of the first section of memory units to the first memory unit of the second section of memory units; and
    erasing, by the processor, the data of the first type stored in the first memory unit of the first section of memory units, the first memory unit of the first section of memory units becoming the empty memory unit after the first trigger event, the empty memory unit remaining positioned between the first section of memory units and the second section of memory units after the first trigger event, the memory units in the first section of memory units remaining logically contiguous after the first trigger event, and the memory units in the second section of memory units remaining logically contiguous after the first trigger event; and
in response to detecting a second trigger event after the first trigger event;
    relocating, by the processor, data of the second type stored in a second memory unit of the second section of memory units to the empty memory unit;
    relocating, by the processor, data of the first type stored in a second memory unit of the first section of memory units to the second memory unit of the second section of memory units; and
    erasing, by the processor, the data of the first type stored in the second memory unit of the first section of memory units, the second memory unit of the first section of memory units becoming the empty memory unit after the second trigger event, the empty memory unit remaining positioned between the first section of memory units and the second section of memory units after the second trigger event, the memory units in the first section of memory units remaining logically contiguous after the second trigger event, and the memory units in the second section of memory units remaining logically contiguous after the second trigger event.

2. The method of claim 1, wherein the first trigger event and the second trigger event occur when at least one of a frequency of accesses to one or more of the memory units in the first section of memory units reaches a pre-determined threshold.

3. The method of claim 1, wherein the first trigger event and the second trigger event occur according to a predetermined schedule indicating when a next iteration of wear-leveling needs to be performed on the cross-point memory.

4. The method of claim 3, further comprising relocating the data stored in the first memory unit of the first section of memory units to a location of the first memory unit of the second section of memory units.

5. The method of claim 1, further comprising relocating the data stored in the first memory unit of the second section of memory units to a location of the first memory unit of the first section of memory units.

6. The method of claim 5, wherein the first section of memory units comprises a plurality of small memory units (SMUs) configured to store the data of the first type, wherein the second section of memory units comprises a plurality of large memory units (LMUs) configured to store the data of the second type, wherein the cross-point memory further comprises a third section of memory units, and wherein the third section of memory units comprises a plurality of medium memory units (MMUs) configured to store data of a third type.

7. The method of claim 1, wherein a first access frequency is a first range of access frequencies, and wherein a second access frequency is a second range of access frequencies.

8. A cross-point memory system, comprising: a plurality of small memory units (SMUs) stored in logically contiguous locations in the cross-point memory system and configured to store data of a first type, the data of the first type being hot data that is frequently accessed, the hot data stored at each of the SMUs comprising a portion of a flash translation layer (FTL) table; a plurality of large memory units (LMUs) stored in logically contiguous locations in the cross-point memory system and configured to store data of a second type, the data of the second type being warm data or cold data, the warm data or the cold data comprising data that is less frequently accessed than the portion of the FTL that is the hot data; an empty memory unit positioned between the plurality of SMUs and the plurality of LMUs to create a logical contiguity of data stored in the plurality of SMUs, the plurality of LMUs, and the empty memory unit; and at least one processor configured to: detect a first trigger event; in response to the first trigger event: relocate data of the second type stored in a first LMU of the plurality of LMUs to the empty memory unit; relocate data of the first type stored in a first SMU of the plurality of SMUs to the first LMU of the plurality of LMUs; and erase the data of the first type stored in the first SMU of the plurality of SMUs, the first SMU of the plurality of SMUs becoming the empty memory unit after the First trigger event, the empty memory unit remaining positioned between the plurality of SMUs and the plurality of LMUs after the first trigger event, the memory units in the plurality of SMUs remaining logically contiguous after the first trigger event, and the memory units in the plurality of LMUs remaining logically contiguous after the first trigger event; detect a second trigger event after the first trigger event; and in response to the second trigger event: relocate data of the second type stored in a second LMU of the plurality of LMUs to the empty memory unit; relocate data of the first type stored in a second SMU of the plurality of SMUs to a location of the second LMU; and erase the data of the first type stored in the second SMU, the second SMU becoming the empty memory unit after the second trigger event, the empty memory unit remaining positioned between the plurality of SMUs and the plurality of LMUs after the second trigger event, the memory units in the plurality of SMUs remaining logically contiguous after the second trigger event, and the memory units in the plurality of LMUs remaining logically contiguous after the second trigger event.

9. The cross-point memory system of claim 8, wherein the empty memory unit comprises one or more empty memory units that are contiguously disposed in between the plurality of LMUs and the plurality of SMUs.

10. The cross-point memory system of claim 8, wherein the at least one processor is further configured to:
update location data of the cross-point memory system to indicate that the data stored in the first SMU has been relocated to a location of the memory unit adjacent to the last SMU; and
update the location data of the cross-point memory system to indicate that the data stored in the first LMU has been relocated to a location of the memory unit adjacent to the last LMU.

11. The cross-point memory system of claim 8, wherein the data of the first type is data that has been accessed within a predetermined time period.

12. The cross-point memory system of claim 8, further comprising at least one empty buffer memory unit configured to temporarily store the data stored in the first LMU while the data in the first SMU is relocated to the memory unit adjacent to the last LMU.

13. The cross-point memory system of claim 8, further comprising at least one empty buffer memory unit configured to temporarily store the data stored in the first SMU while the data in the first LMU is relocated to the memory unit adjacent to the last SMU.

14. The cross-point memory system of claim 8, wherein a first access frequency is a first range of access frequencies, and wherein a second access frequency is a second range of access frequencies.

15. A hybrid memory device (HMD), comprising: a cross-point memory comprising a first plurality of memory units (MUs) stored in logically contiguous locations in the cross-point memory, a second plurality of MUs stored in logically contiguous locations in the cross-point memory, and an empty memory unit positioned between the first plurality of MUs and the second plurality of MUs to create logical contiguity of data stored in the first plurality of MUs, the second plurality of MUs, and the empty memory unit, the first plurality of MUs being configured to store data of a first type, the data of the first type being hot data that is frequently accessed, the hot data stored at each of the first plurality of MUs comprising a portion of a flash translation layer (FTL) table, the second plurality of MUs being configured to store data of a second type, the data of the second type being warm data or cold data, the warm data or the cold data comprising data that is less frequently accessed than the portion of the FTL that is the hot data; and a processor coupled to the cross-point memory and configured to: detect a first trigger event that triggers an iteration of wear-leveling to be performed on the cross-point memory; in response to the first trigger event: relocate data of the second type stored in a first MU of the second plurality of MUs to a MU adjacent to the empty memory unit; relocate data of the first type stored in a first MU of the first plurality of MUs to the first MU of the second plurality of MUs; and erase the data of the first type stored in the first MU of the first plurality of MUs, the first MU of the first plurality of MUs becoming the empty memory unit after the first trigger event, the empty memory unit remaining positioned between the first plurality of MUs and the second plurality of MUs after the first trigger event, the first plurality of MUs remaining logically contiguous after the first trigger event, and the second plurality of MUs remaining logically contiguous after the first trigger event; detect a second trigger event; and in response to the second trigger event: relocate data of the second type stored in a second MU of the second plurality of MUs to the empty memory unit; relocate data of the first type stored in a second MU of the first plurality of Ws to a location of the second MU of the second plurality of MUs; and erase the data of the first type stored in the second MU of the first plurality of Ws, the second MU of the first plurality of Ws becoming the empty memory unit after the second trigger event, the empty memory unit remaining positioned between the first plurality of MUs and the second plurality of MUs after the second trigger event, the first plurality of MUs remaining logically contiguous after the second trigger event, and the second plurality of Ws remaining logically contiguous after the second trigger event.

16. The HMD of claim 15, further comprising a secondary memory coupled to the processor and the cross-point memory.

17. The HMD of claim 15, further comprising a temporary memory coupled to the processor and the cross-point memory, wherein the temporary memory comprises at least one of a location of the first MU of the first plurality of MUs, a location of the last MU of the first plurality of MUs, a location of the first MU of the second plurality of MUs, and a location of the last MU of the second plurality of MUs.

18. The HMD of claim 17, wherein the location of the first MU of the first plurality of MUs is updated after the data stored in the first MU of the first plurality of MUs is relocated to a memory unit adjacent to the last MU of the first plurality of MUs, and wherein the location of the first MU of the second plurality of MUs is updated after the data stored in the first MU of the second plurality of MUs is relocated to a memory unit adjacent to the last MU of the second plurality of MUs.

19. The HMD of claim 15, wherein the cross-point memory comprises at least one empty buffer memory unit.

20. The HMD of claim 15, wherein a first access frequency is a first range of access frequencies, and wherein a second access frequency is a second range of access frequencies.

* * * * *

UNITED STATES PATENT AND TRADEMARK OFFICE
CERTIFICATE OF CORRECTION

PATENT NO. : 11,556,462 B2
APPLICATION NO. : 15/420696
DATED : January 17, 2023
INVENTOR(S) : Xiangyu Tang et al.

It is certified that error appears in the above-identified patent and that said Letters Patent is hereby corrected as shown below:

In the Claims

Column 30, Claim 15, Lines 36-67, through Column 31, Lines 1-17, should read as:
15. A hybrid memory device (HMD), comprising:
a cross-point memory comprising a first plurality of memory units (MUs) stored in logically contiguous locations in the cross-point memory, a second plurality of MUs stored in logically contiguous locations in the cross-point memory, and an empty memory unit positioned between the first plurality of MUs and the second plurality of MUs to create logical contiguity of data stored in the first plurality of MUs, the second plurality of MUs, and the empty memory unit, the first plurality of MUs being configured to store data of a first type, the data of the first type being hot data that is frequently accessed, the hot data stored at each of the first plurality of MUs comprising a portion of a flash translation layer (FTL) table, the second plurality of MUs being configured to store data of a second type, the data of the second type being warm data or cold data, the warm data or the cold data comprising data that is less frequently accessed than the portion of the FTL that is the hot data; and
a processor coupled to the cross-point memory and configured to:
detect a first trigger event that triggers an iteration of wear-leveling to be performed on the cross-point memory;
in response to the first trigger event:
relocate data of the second type stored in a first MU of the second plurality of MUs to a MU adjacent to the empty memory unit;
relocate data of the first type stored in a first MU of the first plurality of MUs to the first MU of the second plurality of MUs; and
erase the data of the first type stored in the first MU of the first plurality of MUs, the first MU of the first plurality of MUs becoming the empty memory unit after the first trigger event, the empty memory unit remaining positioned between the first plurality of MUs and the second plurality of MUs after the first trigger event, the first plurality of MUs remaining logically contiguous after the first trigger event, and the second plurality of MUs remaining logically contiguous after the first trigger event;
detect a second trigger event; and
in response to the second trigger event:

Signed and Sealed this
Twenty-eighth Day of February, 2023

Katherine Kelly Vidal
*Director of the United States Patent and Trademark Office* relocate data of the second type stored in a second MU of the second plurality of MUs to the empty memory unit;

relocate data of the first type stored in a second MU of the first plurality of MUs to a location of the second MU of the second plurality of MUs; and erase the data of the first type stored in the second MU of the first plurality of MUs, the second MU of the first plurality of MUs becoming the empty memory unit after the second trigger event, the empty memory unit remaining positioned between the first plurality of MUs and the second plurality of MUs after the second trigger event, the first plurality of MUs remaining logically contiguous after the second trigger event, and the second plurality of MUs remaining logically contiguous after the second trigger event.